United States Patent
Maki

[11] Patent Number: 6,118,561
[45] Date of Patent: *Sep. 12, 2000

[54] WAVELENGTH DIVISION MULTIPLEXING OPTICAL TRANSMITTER AND WAVELENGTH DIVISION MULTIPLEXING-DEMULTIPLEXING OPTICAL TRANSMISSION-RECEPTION SYSTEM

[75] Inventor: Takanori Maki, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,188

[22] Filed: Apr. 14, 1997

[30] Foreign Application Priority Data

Sep. 10, 1996 [JP] Japan ................................ 8-239611

[51] Int. Cl.$^7$ .............................. H04J 14/02; H04B 10/00
[52] U.S. Cl. ........................ 359/124; 359/125; 359/161
[58] Field of Search ..................... 359/124, 125, 359/161, 179; 385/24

[56] References Cited

U.S. PATENT DOCUMENTS

| | | | |
|---|---|---|---|
| 5,410,624 | 4/1995 | Morkel ........................................ | 385/24 |
| 5,546,210 | 8/1996 | Chraplyvy ................................ | 359/124 |
| 5,589,969 | 12/1996 | Taga et al. .............................. | 359/124 |
| 5,917,625 | 6/1999 | Ogusu et al. ............................ | 359/130 |

OTHER PUBLICATIONS

K. Akiba, et al., "A Study of 1×8 Arrayed–Waveguide Grating Multiplexer", p. 227 & Abstract.

A. Inoue, et al., Optoelectroncis, vol. 10, No. 1; "Fabrication and Application of Fiber Bragg Grating", pp. 119–130 (Mar. 1995).

Primary Examiner—Jason Chan
Assistant Examiner—Dalzid Singh
Attorney, Agent, or Firm—Staas & Halsey, LLP

[57] ABSTRACT

The invention provides a wavelength division multiplexing optical transmitter wherein an unequally spaced arrangement of optical wavelengths can be realized readily and economically. The wavelength division multiplexing optical transmitter includes an optical transmission section for outputting a plurality of optical signals having wavelengths spaced by unequal distances from each other, and a wave multiplexer having an equally spaced wavelength optical multiplexing characteristic of multiplexing a plurality of optical signals having wavelengths spaced by a substantially equal distance from each other. The wave multiplexer being constructed such that, when the plurality of optical signals are inputted thereto from the optical transmission section, the wave multiplexer multiplexes the plurality of optical signals from the optical transmission section into a multiplexed optical signal and outputs the multiplexed optical signal. Also a wavelength division multiplexing-demultiplexing optical transmission-reception system which incorporates the wavelength division multiplexing optical transmitter is disclosed.

44 Claims, 11 Drawing Sheets

WAVELENGTH DIVISION MULTIPLEXING OPTICAL TRANSMITTER AND WAVELENGTH DIVISION MULTIPLEXING-DEMULTIPLEXING OPTICAL TRANSMISSION-RECEPTION SYSTEM

BACKGROUND OF THE INVENTION

1. Field of the Invention

This invention relates to a wavelength division multiplexing optical transmitter and a wavelength division multiplexing-demultiplexing optical transmission-reception system to which the wavelength division multiplexing optical transmitter is applied.

2. Description of the Related Art

Long haul large capacity submarine optical communication systems which make use of optical amplification have already been put into practical use. In order to further increase the capacity, much effort is being directed to development of an optical wavelength division multiplex (WDM) system to put it into practical use by various organizations for research and development.

In order to put the WDM system into practical use, it is essentially required to make investigations for a main transmission line and particularly to suppress the signal to noise ratio (SNR) when the WDM system is implemented.

As a factor which deteriorates the optical SNR peculiar to the WDM system described above, beat noise arising from four-wave mixing is generally known, and for an optical wave multiplexer or demultiplexer to be developed for use with a WDM system, it is required to suppress the four-wave mixing just mentioned.

By the way, it is known that beat noise arising from four-wave mixing mentioned above can be suppressed by arranging, when to multiplex and transmit a plurality of optical signals, the wavelengths of the optical signals to be multiplexed and transmitted in an unequally spaced relationship from each other.

Accordingly, it has been examined to employ, as an optical wave multiplexer or demultiplexer to be used by the WDM system described above, an optical wave multiplexer or demultiplexer which includes, for example, a plurality of filters which extract optical signals having wavelengths arranged in an unequally spaced relationship from each other to allow an unequally spaced arrangement of optical wavelengths.

With the system which suppresses beat noise using such an optical wave multiplexer or demultiplexer as described above, however, a plurality of filters which extract optical signals having wavelengths arranged in an unequally spaced relationship from each other are used, and it is difficult to finely adjust the wavelengths of light passing through the filters.

Accordingly, the system described above has a subject to be solved in that it is difficult to obtain required characteristics for multiplexed light signals (that the wavelengths are arranged in an unequally spaced relationship from each other). Besides, a filter which is high in accuracy must be used for the filters, which makes an obstacle to reduction in cost.

SUMMARY OF THE INVENTION

It is an object of the present invention to provide a wavelength division multiplexing optical transmitter for an optical multiplex communication system and a wavelength division multiplexing-demultiplexing optical transmission-reception system wherein an unequally spaced arrangement of optical wavelengths can be realized readily and economically.

In order to attain the object described above, according to an aspect of the present invention, there is provided a wavelength division multiplexing optical transmitter, comprising an optical transmission section for outputting a plurality of optical signals having wavelengths spaced by unequal distances from each other, and a wave multiplexer having an equally spaced wavelength optical multiplexing characteristic of multiplexing a plurality of optical signals having wavelengths spaced by a substantially equal distance from each other, the wave multiplexer being constructed such that, when the plurality of optical signals are inputted thereto from the optical transmission section, the wave multiplexer multiplexes the plurality of optical signals from the optical transmission section into a multiplexed optical signal and outputs the multiplexed optical signal.

With the wavelength division multiplexing optical transmitter, when the plurality of optical signals from the optical transmission section are inputted to the wave multiplexer, the wave multiplexer can multiplex the plurality of optical signals from the optical transmission section into a multiplexed optical signal and output the optical signal. Consequently, while a wave multiplexer which has an equally spaced wave multiplexing characteristic is employed, an equally spaced arrangement of optical wavelengths can be realized readily. Accordingly, the wavelength division multiplexing optical transmitter is advantageous in that the cost for construction of a wavelength division multiplex optical transmitter can be reduced while effectively suppressing beat noise originating from four wave mixing.

According to another aspect of the present invention, there is provided a wavelength division multiplexing optical transmitter, comprising an optical transmission section for outputting a plurality of optical signals having wavelengths spaced by unequal distances from each other, and a wave multiplexing section including a plurality of wave multiplexers connected in parallel and having an equally spaced wavelength optical multiplexing characteristic for multiplexing a plurality of optical signals having wavelengths spaced by a substantially equal distance from each other, the wave multiplexer being constructed such that, when the plurality of optical signals are inputted thereto from the optical transmission section, the wave multiplexer multiplexes the plurality of optical signals from the optical transmission section into a multiplexed optical signal and outputs the multiplexed optical signal.

With the wavelength division multiplexing optical transmitter, when the plurality of optical signals from the optical transmission section are inputted to the wave multiplexing section, the wave multiplexing section can multiplex the plurality of optical signals from the optical transmission section into a multiplexed optical signal and output the optical signal. Consequently, while a plurality of wave multiplexers which have an equally spaced wave multiplexing characteristic are employed, an equally spaced arrangement of optical wavelengths can be realized readily. Accordingly, the wavelength division multiplexing optical transmitter is advantageous in that the cost for construction of a wavelength division multiplex optical transmitter can be reduced while effectively suppressing beat noise originating from four wave mixing.

According to a further aspect of the present invention, there is provided a wavelength division multiplexing-demultiplexing optical transmission-reception system, comprising a wavelength division multiplexing optical transmitter including an optical transmission section for outputting a plurality of optical signals having wavelengths spaced by unequal distances from each other, and a wave multiplexer having an equally spaced wavelength optical multiplexing characteristic of multiplexing a plurality of optical signals having wavelengths spaced by a substantially equal distance from each other, the wave multiplexer being constructed such that, when the plurality of optical signals are inputted thereto from the optical transmission section, the wave multiplexer multiplexes the plurality of optical signals from the optical transmission section into a multiplexed optical signal and outputs the multiplexed optical signal, and a wavelength division demultiplexing optical receiver including a wave demultiplexer having an equally spaced wavelength optical demultiplexing characteristic of demultiplexing an optical signal having wavelengths spaced by substantially equal distances from each other, and an optical reception section for receiving optical signals having wavelengths spaced by unequal distances from each other, the wave demultiplexer being constructed such that, when the optical signal from the wavelength division multiplexing optical transmitter is inputted thereto, the wave demultiplexer demultiplexes the optical signal from the wavelength division multiplexing optical transmitter into a plurality of optical signals having wavelengths spaced by unequal distances from each other and outputs the plurality of optical signals to the optical reception section.

With the wavelength division multiplexing-demultiplexing optical transmission-reception system, when the plurality of optical signals from the optical transmission section are inputted to the wave multiplexer, the wave multiplexer can multiplex the plurality of optical signals from the optical transmission section into a multiplexed optical signal and output the optical signal. Consequently, while a wave multiplexer which has an equally spaced wave multiplexing characteristic is employed, an equally spaced arrangement of optical wavelengths can be realized readily. Accordingly, the wavelength division multiplexing-demultiplexing optical transmission-reception system is advantageous in that the cost for construction of a wavelength division multiplex optical transmitter can be reduced while effectively suppressing beat noise originating from four wave mixing.

According to a still further aspect of the present invention, there is provided a wavelength division multiplexing-demultiplexing optical transmission-reception system, comprising a wavelength division multiplexing optical transmitter including an optical transmission section for outputting a plurality of optical signals having wavelengths spaced by unequal distances from each other, and a wave multiplexing section including a plurality of wave multiplexers connected in parallel and having an equally spaced wavelength optical multiplexing characteristic for multiplexing a plurality of optical signals having wavelengths spaced by a substantially equal distance from each other, the wave multiplexing section being constructed such that, when the plurality of optical signals are inputted thereto from the optical transmission section, the wave multiplexing section multiplexes the plurality of optical signals from the optical transmission section into a multiplexed optical signal and outputs the multiplexed optical signal, and a wavelength division demultiplexing optical receiver including a wave demultiplexing section including a plurality of wave multiplexers connected in parallel and having an equally spaced wavelength optical multiplexing characteristic of demultiplexing an optical signal having wavelengths spaced by substantially equal distances from each other, and an optical reception section for receiving optical signals having wavelengths spaced by unequal distances from each other, the wave demultiplexing section being constructed such that, when the optical signal from the wavelength division multiplexing optical transmitter is inputted thereto, the wave demultiplexing section demultiplexes the optical signal from the wavelength division multiplexing optical transmitter into a plurality of optical signals having wavelengths spaced by unequal distances from each other and outputs the plurality of optical signals to the optical reception section.

With the wavelength division multiplexing-demultiplexing optical transmission-reception system, when the plurality of optical signals from the optical transmission section are inputted to the wave multiplexing section, the wave multiplexing section can multiplex the plurality of optical signals from the optical transmission section into a multiplexed optical signal and output the optical signal. Consequently, while a plurality of wave multiplexers which have an equally spaced wave multiplexing characteristic are employed, an equally spaced arrangement of optical wavelengths can be realized readily. Accordingly, the wavelength division multiplexing optical transmitter and the wavelength division multiplexing-demultiplexing optical transmission-reception system are advantageous in that the cost for construction of a wavelength division multiplex optical transmitter can be reduced while effectively suppressing beat noise originating from four wave mixing.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Different aspects of the present invention are first described with reference to the accompanying drawings.

Figure 1:
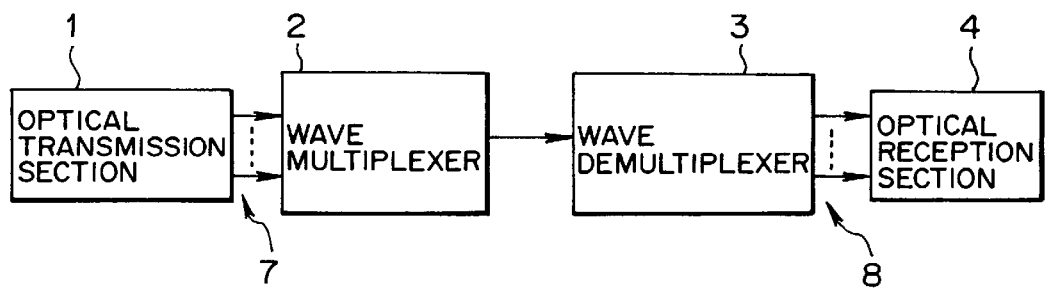
FIG. 1 is a block diagram illustrating an aspect of the present invention.

FIG. 1 shows in block diagram a wavelength division multiplexing-demultiplexing optical transmission-reception system according to an aspect of the present invention. Referring to FIG. 1, the wavelength division multiplexing-demultiplexing optical transmission-reception system shown includes a wavelength division multiplexing optical transmitter 7 and a wavelength division demultiplexing optical receiver 8.

The wavelength division multiplexing optical transmitter 7 includes an optical transmission section 1 for outputting a plurality of optical signals having wavelengths spaced by unequal distances from each other, and a wave multiplexer 2 having an equally spaced wavelength optical multiplexing characteristic of multiplexing a plurality of optical signals having wavelengths spaced by a substantially equal distance from each other.

The plurality of optical signals from the optical transmission section 1 are inputted to the wave multiplexer 2. Consequently, the wave multiplexer 2 multiplexes the plurality of optical signals from the optical transmission section 1 into a multiplexed optical signal and outputs the multiplexed optical signal.

Meanwhile, the wavelength division demultiplexing optical receiver 8 includes a wave demultiplexer 3 having an equally spaced wavelength optical demultiplexing characteristic of demultiplexing an optical signal having wavelengths spaced by substantially equal distances from each other, and an optical reception section 4 for receiving optical signals having wavelengths spaced by unequal distances from each other.

The optical signal from the wavelength division multiplexing optical transmitter 7 is inputted to the wave demultiplexer 3. Consequently, the wave demultiplexer 3 demultiplexes the optical signal from the wavelength division multiplexing optical transmitter 7 into a plurality of optical signals having wavelengths spaced by unequal distances from each other and outputs the plurality of optical signals to the optical reception section 4.

The optical transmission section 1 may include a plurality of light source-external modulator pairs each including a light source for outputting an optical signal of a wavelength and an external modulator.

The wave multiplexer 2 may be formed from an arrayed-waveguide grating optical multiplexer or from an optical coupler having formed thereon a plurality of dielectric multi-layer films capable of passing optical signals of different wavelengths from each other therethrough.

Or else, the wave multiplexer 2 may be formed from a plurality of directional coupler-fiber grating filter pairs each including a directional coupler and a fiber grating filter for reflecting an optical signal of a wavelength and connected in a plurality of stages in tandem.

The wavelength division multiplexing optical transmitter 7 or the wavelength division multiplexing-demultiplexing optical transmission-reception system may be constructed such that the wave multiplexer 2 includes a plurality of filters for extracting optical signals having different frequencies from the optical signals inputted thereto from the optical transmission section 1, the filters being constructed such that center frequencies thereof are set in a substantially equally spaced relationship from each other and wavelength pass characteristics thereof are wide band characteristics within ranges which do not include the center frequencies of adjacent ones of the filters so that the plurality of optical signals from the optical transmission section 1 whose wavelengths are spaced by the unequal distances from each other pass through the plurality of filters.

With the wavelength division multiplexing optical transmitter or the wavelength division multiplexing-demultiplexing optical transmission-reception system according to the present invention, when the plurality of optical signals from the optical transmission section are inputted to the wave multiplexer, the wave multiplexer can multiplex the plurality of optical signals from the optical transmission section into a multiplexed optical signal and output the optical signal. Consequently, while a wave multiplexer which has an equally spaced wave multiplexing characteristic is employed, an equally spaced arrangement of optical wavelengths can be realized readily. Accordingly, the wavelength division multiplexing optical transmitter and the wavelength division multiplexing-demultiplexing optical transmission-reception system are advantageous in that the cost for construction of a wavelength division multiplex optical transmitter can be reduced while effectively suppressing beat noise originating from four wave mixing.

Or, the wavelength division multiplexing optical transmitter 7 or the wavelength division multiplexing-demultiplexing optical transmission-reception system may be constructed such that the wave multiplexer 2 includes a plural number of filters larger than the number of the optical signals outputted from the optical transmission section 1 for extracting optical signals hiving different frequencies from among the optical signals inputted thereto from the optical transmission section 1, the filters being constructed such that center frequencies thereof are set in a neighboring and substantially equally spaced relationship from each other so that each of the plurality of optical signals from the optical transmission section 1 whose wavelengths are spaced by the unequal distances from each other passes through one of the filters.

Accordingly, with the wavelength division multiplexing optical transmitter or the wavelength division multiplexing-demultiplexing optical transmission-reception system according to the present invention, while a wave multiplexer which has an equally spaced wave multiplexing characteristic is employed, an equally spaced arrangement of optical wavelengths can be realized readily. Thus, the wavelength division multiplexing optical transmitter and the wavelength division multiplexing-demultiplexing optical transmission-reception system are advantageous in that the cost for construction of a wavelength division multiplex optical transmitter can be reduced while effectively suppressing beat noise originating from four wave mixing. Besides, since the degree of freedom in manner of an unequally spaced arrangement of the wavelengths of the optical signals transmitted from the optical transmission section is augmented in a predetermined band, the wavelength division multiplexing optical transmitter and the wavelength division multiplexing-demultiplexing optical transmission-reception system are advantageous in that the unequally spaced arrangement can be adjusted readily without varying the specifications of the wave multiplexer and also in that the universal use of an equally spaced wave multiplexer for multiplexing optical signals arranged in an unequally spaced relationship from each other can be augmented.

Figure 2:
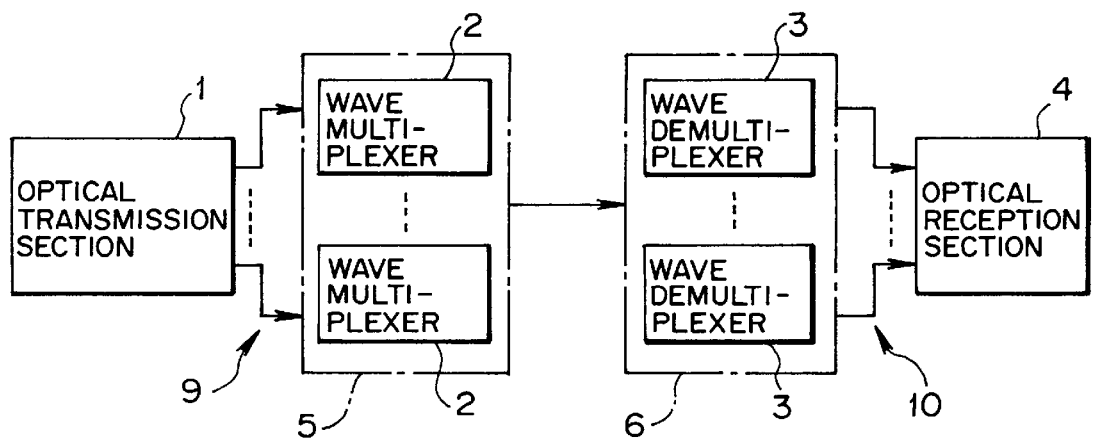
FIG. 2 is a block diagram illustrating another aspect of the present invention.

Referring now to FIG. 2, there is shown in block diagram a wavelength division multiplexing-demultiplexing optical transmission-reception system according to an aspect of the present invention. The wavelength division multiplexing-demultiplexing optical transmission-reception system shown includes a wavelength division multiplexing optical transmitter 9 and a wavelength division demultiplexing optical receiver 10.

The wavelength division multiplexing optical transmitter 9 includes an optical transmission section 1 for outputting a plurality of optical signals having wavelengths spaced by unequal distances from each other, and a wave multiplexing section 5 including a plurality of wave multiplexers 2 connected in parallel and having an equally spaced wavelength optical multiplexing characteristic for multiplexing a plurality of optical signals having wavelengths spaced by a substantially equal distance from each other.

The wave multiplexer 2 is constructed such that, when the plurality of optical signals are inputted thereto from the optical transmission section 1, the wave multiplexer 2 multiplexes the plurality of optical signals from the optical transmission section 1 into a multiplexed optical signal and outputs the multiplexed optical signal.

Meanwhile, the wavelength division demultiplexing optical receiver 10 includes a wave demultiplexing section 6 including a plurality of wave multiplexers 3 connected in parallel and having an equally spaced wavelength optical multiplexing characteristic of demultiplexing an optical signal having wavelengths spaced by substantially equal distances from each other, and an optical reception section 4 for receiving optical signals having wavelengths spaced by unequal distances from each other.

The wave demultiplexing section 6 is constructed such that, when the optical signal from the wavelength division multiplexing optical transmitter 7 is inputted thereto, the wave demultiplexing section 6 demultiplexes the optical signal from the wavelength division multiplexing optical transmitter 7 into a plurality of optical signals having wavelengths spaced by unequal distances from each other and outputs the plurality of optical signals to the optical reception section 4.

With the wavelength division multiplexing optical transmitter or the wavelength division multiplexing-demultiplexing optical transmission-reception system according to the present invention, when the plurality of optical signals from the optical transmission section are inputted to the wave multiplexing section, the wave multiplexing section can multiplex the plurality of optical signals from the optical transmission section into a multiplexed optical signal and output the optical signal. Consequently, while a plurality of wave multiplexers which have an equally spaced wave multiplexing characteristic are employed, an equally spaced arrangement of optical wavelengths can be realized readily. Accordingly, the wavelength division multiplexing optical transmitter and the wavelength division multiplexing-demultiplexing optical transmission-reception system are advantageous in that the cost for construction of a wavelength division multiplex optical transmitter can be reduced while effectively suppressing beat noise originating from four wave mixing.

b. First Embodiment

Several preferred embodiments of the present invention are described below with reference to the accompanying drawings.

Figure 3:
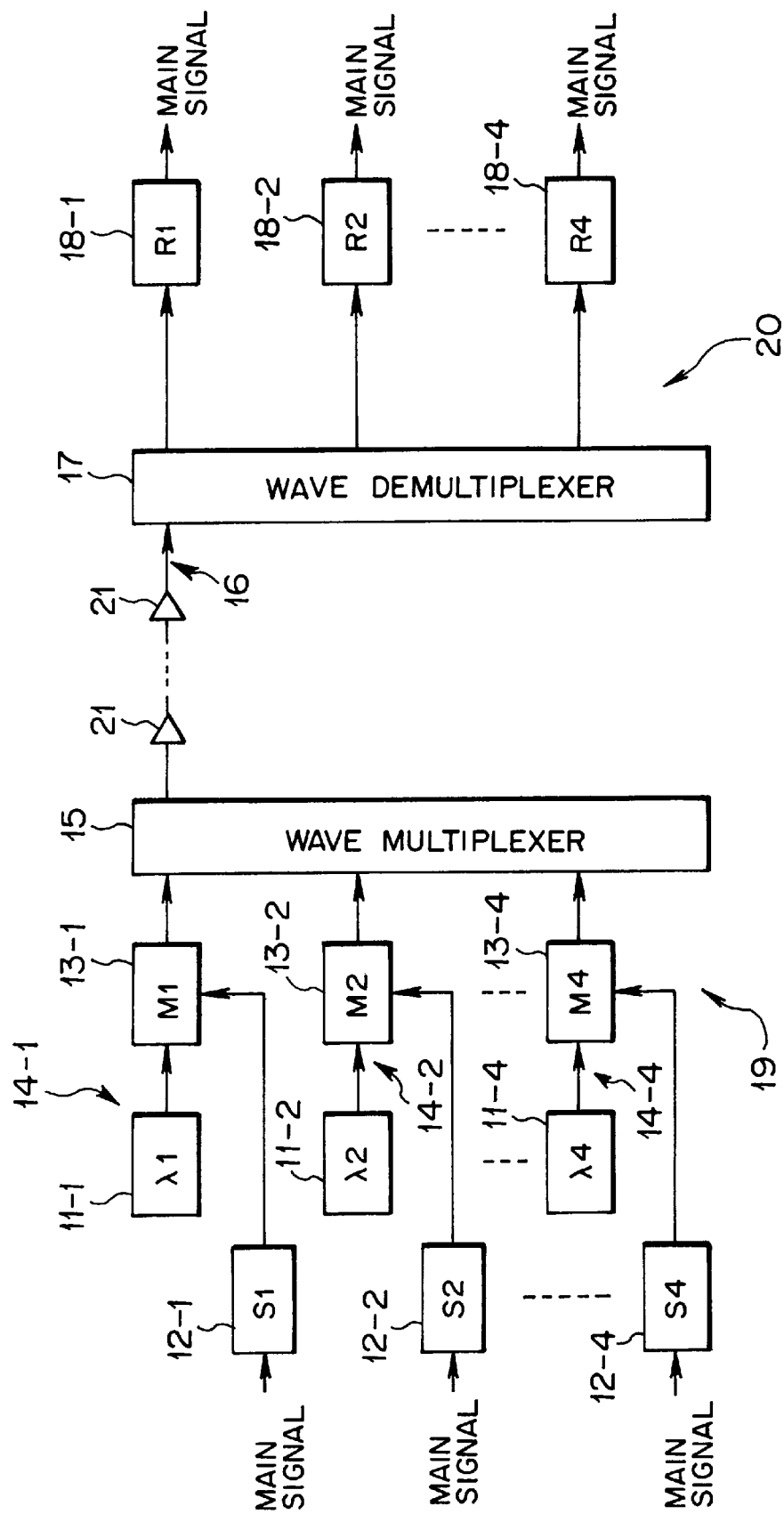
FIG. 3 is a block diagram of a wavelength division multiplexing-demultiplexing optical transmission-reception system showing a preferred embodiment of the present invention.

FIG. 3 shows in block diagram a wavelength division multiplexing-demultiplexing optical transmission-reception system to which the present invention is applied. Referring to FIG. 3, the wavelength division multiplexing-demultiplexing optical transmission-reception system shown includes a wavelength division multiplexing optical transmitter 19 and a wavelength division demultiplexing optical receiver 20 connected to each other by a transmission line 16.

The transmission line 16 is formed using, for example, an optical fiber, and a plurality of optical amplifiers 21 connected in a plurality stages are interposed in the transmission line 16.

The wavelength division multiplexing optical transmitter 19 includes, for example, main signal light sources 11-1 to 11-4, modulation circuits 12-1 to 12-4, external modulators 13-1 to 13-4 and a wave multiplexer 15.

The main signal light sources 11-1 to 11-4 ($\lambda 1$ to $\lambda 4$) are constructed to output optical signals of a fixed level and may each be formed from, for example, a laser diode.

Each of the main signal light sources 11-1 to 11-4 has another function as a light source which can output an optical signal having a desired wavelength.

The wavelengths $\lambda 1$ to $\lambda 4$ of optical signals to be outputted from the main signal light sources 11-1 to 11-4 are arranged and set such that they are spaced by unequal or different distances from each other. In particular, the wavelengths $\lambda 1$ to $\lambda 4$ of the optical signals have such relationships as given by the following expressions (1) to (3):

$$\lambda 1 < \lambda 2 < \lambda 3 < \lambda 4 \qquad (1)$$

$$\lambda 1 - \lambda 2 \neq \lambda 2 - \lambda 3 \qquad (2)$$

$$\lambda 2 - \lambda 3 \neq \lambda 3 - \lambda 4 \qquad (3)$$

Meanwhile, the modulation circuits (S1 to S4) 12-1 to 12-4 produce modulation signals (digital electric signals) to be used for modulation by the external modulators 13-1 to 13-4 described below in response to main signals inputted to them as digital signals.

The external modulators (M1 to M4) 13-1 to 13-4 modulate the optical signals from the main signal light sources 11-1 to 11-4 with digital electric signals as modulation signals from the modulation circuits 12-1 to 12-4, respectively, and output the modulated optical signals to the wave multiplexer 15 in the following stage. The external modulators 13-1 to 13-4 may each be formed from, for example, a Mach-Zehnder modulator.

Accordingly, the main signal light sources 11-1 to 11-4, modulation circuits 12-1 to 12-4 and external modulators 13-1 to 13-4 described above have a function as an optical transmission section which can output optical signals having wavelengths which are spaced by unequal distances from each other. Further, the main signal light sources 11-1 to 11-4 and the external modulators 13-1 to 13-4 construct light source-external modulator pairs 14-1 to 14-4, respectively, each of which is formed from a light source capable of outputting an optical signal having a desired wavelength and an external modulator.

The wave multiplexer 15 has an equally spaced wavelength optical wave multiplexing characteristic by which optical signals having wavelengths which are spaced by a predetermined equal distance from each other can be multiplexed, and multiplexes, when the plurality of modulation optical signals λ1 to λ4 (whose wavelengths are arranged in an unequally spaced relationship from each other) from the light source-external modulator pairs 14-1 to 14-4 are inputted thereto, the optical signals and outputs the optical signal obtained by the multiplexing to the transmission line 16.

The equal space here is a deliberate equal space and is not necessarily limited to a fully equal space. Substantially, due to a dispersion in accuracy among devices, spaces or distances within a range of approximately ±10% with respect to a distance between center wavelengths which spaced by an equal distance from each other can be regarded as equal spaces or distances (substantially equal spaces or distances).

Figure 4:
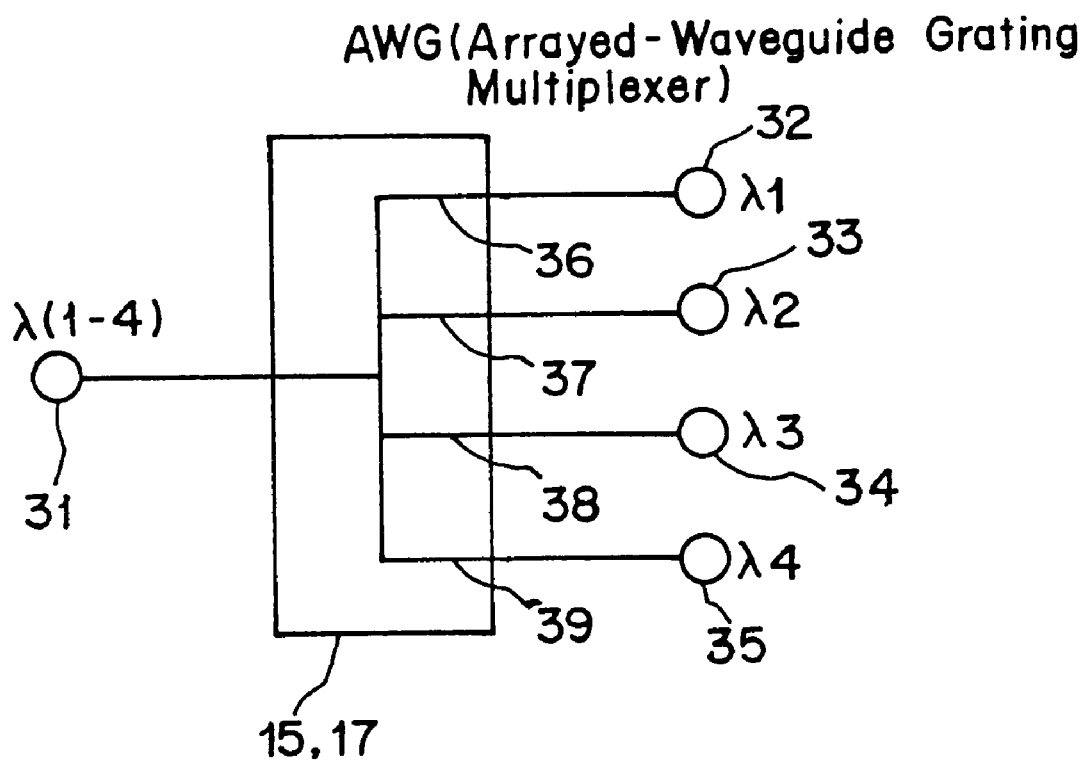
FIG. 4 is a diagrammatic view showing a construction of an arrayed-waveguide grating optical wave multiplexer or demultiplexer employed in the wavelength division multiplexing-demultiplexing optical transmission-reception system of FIG. 3.

The wave multiplexer 15 described above may be constructed, for example, using an arrayed-waveguide grating optical multiplexer or demultiplexer (AWG) as seen in FIG. 4.

Referring to FIG. 4, the wave multiplexer 15 shown has five input/output ports 31 to 35 and includes four waveguides 36 to 39 formed from arrayed-wavelength gratings for connecting the port 31 and the ports 32 to 35, respectively.

Each of the waveguides 36 to 39 has a function as a filter (wave multiplexing filter) for extracting an optical signal having a desired wavelength from among the optical signals inputted thereto from the external modulators 13-1 to 13-4.

Figure 5:
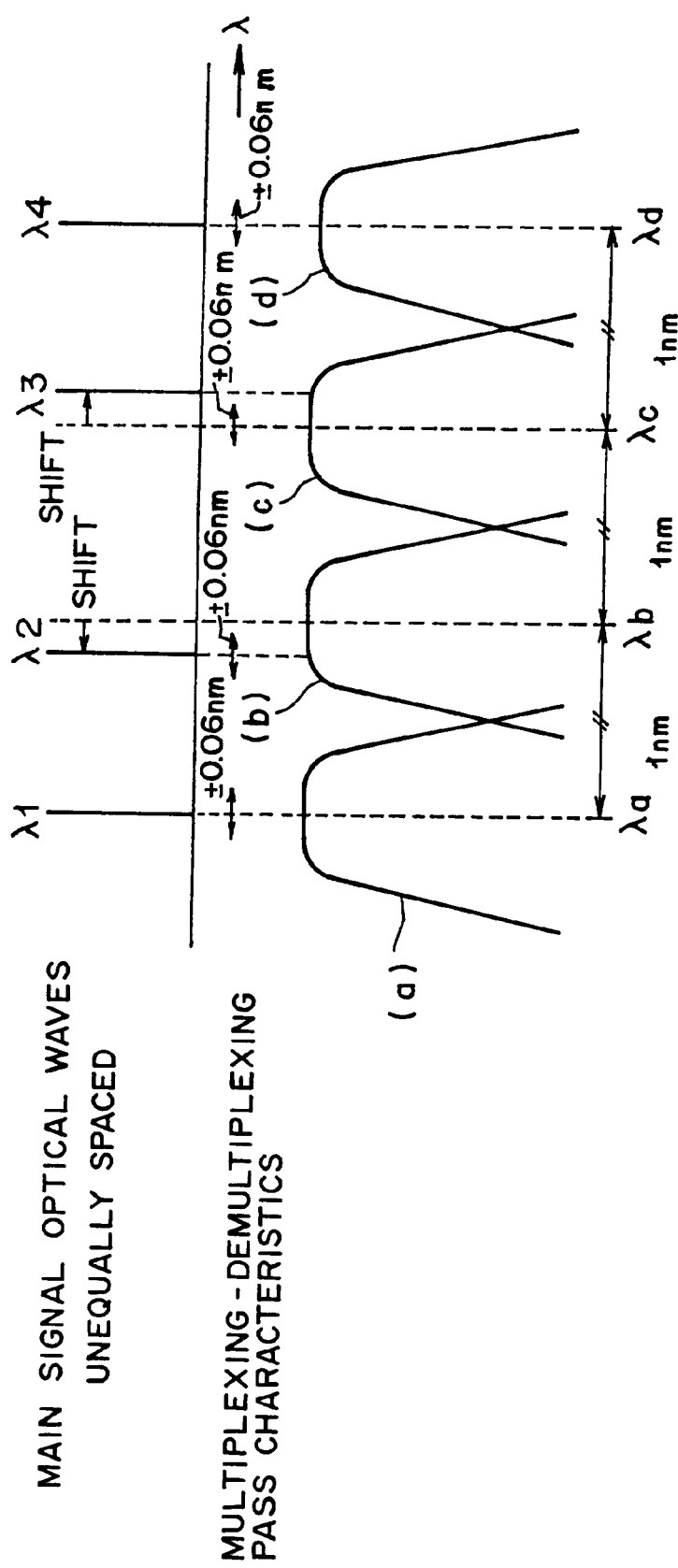
FIG. 5 is a diagram illustrating a wavelength pass characteristic of the wave multiplexer or demultiplexer of FIG. 4.

Wavelength characteristics of an apparatus having the construction of the wave multiplexer 15 shown in FIG. 4 and being examined at present are shown in FIG. 5. In particular, the waveguide 36 has such a pass characteristic as indicated by the waveform (a) of FIG. 5; the waveguide 37 has such a pass characteristic as indicated by the waveform (b) of FIG. 5; the waveguide 38 has such a pass characteristic as indicated by the waveform (c) of FIG. 5; and the waveguide 39 has such a pass characteristic as indicated by the waveform (d) of FIG. 5.

In particular, as seen from the waveforms (a) to (d) of FIG. 5, the center wavelengths (center frequencies) λa to λd of waveforms indicating pass characteristics of the waveguides 36 to 39 are set in an equally spaced relationship by 1 nm from each other, and the wavelength pass characteristics of the waveguides 36 to 39 have wide band characteristics within ranges which do not include the center wavelengths (center frequencies) of the waveforms indicating the pass characteristics of adjacent waveguides.

Further, since the wavelengths of the optical signals λ1 and λ4 from the external modulators 13-1 and 13-4 are set equal to the center wavelengths λa and λd of the waveforms indicating the pass characteristics of the waveguides 36 and 39, the optical signals λ1 and λ4 pass the waveguides 36 and 39, respectively.

Further, while the wavelengths of the optical signals λ2 and λ3 from the external modulators 13-2 and 13-3 are shifted from the center frequencies λb and λc of the waveforms indicating the pass characteristics of the waveguides 37 and 38, the pass characteristics of the waveguides 37 and 38 are set to wide bands so that also the optical signals λ2 and λ3 shifted in wavelength from the center wavelengths λb and λc pass the waveguides 37 and 38, respectively.

Here, while a dispersion by approximately ±0.06 nm can be regarded as an allowable range for the center frequencies due to an error in production of the waveguides, where the number of wavelengths and also the distance between the wavelengths are taken into consideration, the allowable range can be set to approximately ±10% of the width between the center frequencies.

Accordingly, from among the optical signals from the external modulators 13-1 to 13-4, not only the optical signals λ1 and λ4 but also the optical signals λ2 and λ3 which have wavelengths spaced by unequal distances from each other pass the waveguides 36 to 39, respectively.

In other words, in the wave multiplexer 15, the four optical signals λ1 to λ4 from the external modulators 13-1 to 13-4 are inputted to the ports 32 to 35 and then pass the waveguides 36 to 39, whereafter they are multiplexed into and outputted as an optical signal λ(1–4) from the port 31.

Referring back to FIG. 3, the wavelength division demultiplexing optical receiver 20 is formed, for example, from a wave demultiplexer 17 and main signal reception circuits 18-1 to 18-4.

The wave demultiplexer 17 receives an optical signal from the wave multiplexer 15 of the wavelength division multiplexing optical transmitter 19 via the transmission line 16 and demultiplexes the received optical signal back into four original main signals. The wave demultiplexer 17 may be formed, for example, from an arrayed-waveguide grating optical multiplexer or demultiplexer shown in FIG. 4 similarly to the wave multiplexer 15 described hereinabove.

In particular, the wave demultiplexer 17 has a configuration wherein the input and output ports are reversed to those of the wave multiplexer 15 described above. Thus, an optical signal from the wavelength division multiplexing optical transmitter 19 is inputted to the wave multiplexer 15 via the port 31, and four main signals demultiplexed by the wave demultiplexer 17 are outputted via the ports 32 to 35. It is to be noted that, each of the waveguides 36 to 39 which connect the port 31 and the ports 32 to 35 to each other, respectively, is formed from an arrayed-waveguide grating similarly to the wave multiplexer 15 described above.

Also the waveguide 36 of the wave demultiplexer 17 has such a pass characteristic as indicated by the waveform (a) of FIG. 5; the waveguide 37 has such a pass characteristic as indicated by the waveform (b) of FIG. 5; the waveguide 38 has such a pass characteristic as indicated by the waveform (c) of FIG. 5; and the waveguide 39 has such a pass characteristic as indicated by the waveform (d) of FIG. 5.

In particular, the center wavelengths (center frequencies) λa to λd of the waveforms indicating the pass characteristic of the waveguides 36 to 39 are set in a substantially equally spaced relationship from each other as seen from the waveforms (a) to (d) of FIG. 5, and the wavelength pass characteristics of the waveguides 36 to 39 have wide band characteristics within ranges which do not include the center wavelengths (center frequencies) of the waveforms indicating the pass characteristics of adjacent waveguides.

Consequently, the wavelength pass characteristics of the waveguides 36 to 39 of the wave demultiplexer 17 have wide band characteristics within ranges which do not include the center frequencies of adjacent waveguides, and four optical signals originating from an optical signal from the wavelength division multiplexing optical transmitter 19 and having wavelengths spaced by unequal distances from each other pass the waveguides 36 to 39 of an optical coupler 23 (hereinafter described with reference to FIG. 6) which constructs the wave demultiplexer 17.

Accordingly, while the wave demultiplexer 17 has an equally spaced wavelength optical demultiplexing characteristic by which optical signals having wavelengths spaced by an equal distance from each other can be demultiplexed, when it receives an optical signal from the wave multiplexer 15 of the wavelength division multiplexing optical transmitter 19 via the transmission line 16, it can demultiplex the optical signal back into four original main signals and output the main signals.

In other words, when an optical signal from the wavelength division multiplexing optical transmitter 19 is inputted to the wave demultiplexer 17, the wave demultiplexer 17 demultiplexes the optical signal from the wavelength division multiplexing optical transmitter 19 into a plurality of optical signals whose wavelengths are spaced by unequal distances from each other, and outputs the optical signals to the main signal reception circuits 18-1 to 18-4 in the following stage.

Thus, each of the waveguides 36 to 39 which form the wave demultiplexer 17 described above has a function as a demultiplexing filter which extracts an optical signal having a desired wavelength from within an optical signal inputted thereto from the wavelength division multiplexing optical transmitter 19.

Meanwhile, the main signal reception circuits 18-1 to 18-4 have functions as an optical reception section connected to the four output ports 32 to 35 of the wave demultiplexer 17 for receiving optical signals having wavelengths which are spaced by unequal distances from each other.

In particular, the main signal reception circuit 18-1 can receive an optical signal of the wavelength $\lambda 1$ demultiplexed by the wave demultiplexer 17; the main signal reception circuit 18-2 can receive another optical signal of the wavelength $\lambda 2$ demultiplexed by the wave demultiplexer 17; the main signal reception circuit 18-3 can receive a further optical signal of the wavelength $\lambda 3$ demultiplexed by the wave demultiplexer 17; and the main signal reception circuit 18-4 can receive a still further optical signal of the wavelength $\lambda 4$ demultiplexed by the wave demultiplexer 17.

It is to be noted that, when the demultiplexed optical signals $\lambda 1$ to $\lambda 4$ are received, the main signal reception circuits 18-1 to 18-4 can perform predetermined demodulation processing to convert the optical signals $\lambda 1$ to $\lambda 4$ into electric signals or some other suitable signals and output the electric signals or the like as demodulated main signals.

In the wavelength division multiplexing-demultiplexing optical transmission-reception system according to the first embodiment of the present invention having the construction described above, digital signals from the modulation circuits 12-1 to 12-4 serving as main signal sources are first modulated at a high speed into optical signals of the wavelengths $\lambda 1$ to $\lambda 4$ by the external modulators 13-1 to 13-4 of the wavelength division multiplexing optical transmitter 19, and then the thus modulated signals are optically wavelength division multiplexed by the wave multiplexer 15 so that they are outputted as an optical signal $\lambda(1-4)$ from the wave multiplexer 15 to the transmission line 16.

In other words, the wave multiplexer 15 takes a countermeasure against beat noise arising from four wave mixing by multiplexing and outputting the optical signals of the wavelengths $\lambda 1$ to $\lambda 4$ arranged in an unequally spaced relationship from each other.

In particular, since the wavelength pass characteristics of the waveguides 36 to 39 which construct the wave multiplexer 15 are wide band characteristics within ranges which do not include the center wavelengths of the optical signals passed by adjacent waveguides, the four optical signals $\lambda 1$ to $\lambda 4$ from the light source-external modulator pairs 14-1 to 14-4 arranged in an unequally spaced relationship from each other pass the waveguides 36 to 39 and are multiplexed with each other and outputted as an optical signal $\lambda(1-4)$ to the transmission line 16.

It is to be noted that the optical signal $\lambda(1-4)$ transmitted on the transmission line 16 is successively amplified by the optical amplifiers 21 so that it is outputted to the wavelength division demultiplexing optical receiver 20 without suffering from any deterioration in optical level thereof.

Meanwhile, in the wavelength division demultiplexing optical receiver 20, the wave demultiplexer 17 receives the optical signal $\lambda(1-4)$ from the wavelength division multiplexing optical transmitter 19, to which the countermeasure against beat noise has been performed by the wavelength division multiplexing optical transmitter 19, demultiplexes the optical signal $\lambda(1-4)$ into original optical signals of the wavelengths $\lambda 1$ to $\lambda 4$ and outputs the optical signals to the main signal reception circuits 18-1 to 18-4, respectively.

In this manner, with the wavelength division multiplexing-demultiplexing optical transmission-reception system according to the first embodiment of the present invention, when the plurality of optical signals from the plurality of light source-external modulator pairs 14-1 to 14-n are inputted to the wave multiplexer 15, the wave multiplexer 15 can multiplex the plurality of optical signals from the light source-external modulator pairs 14-1 to 14-4 and output a signal obtained by the multiplexing. Consequently, while the wave multiplexer 15 which has an equally spaced wave multiplexing characteristic is employed, an equally spaced arrangement of optical wavelengths can be realized readily. Accordingly, the wavelength division multiplexing-demultiplexing optical transmission-reception system is advantageous in that the cost for construction of a wavelength division multiplex optical transmitter can be reduced while effectively suppressing beat noise originating from four wave mixing.

b1. First Modification to the First Embodiment

Figure 6:
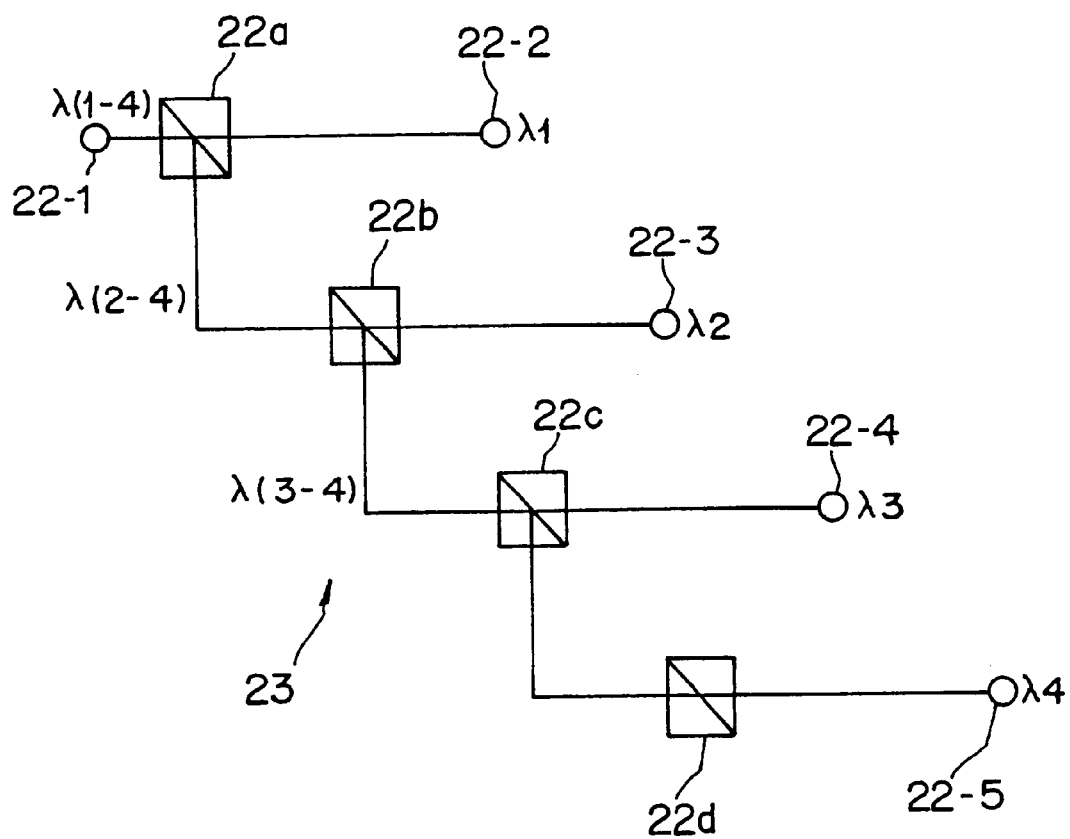
FIG. 6 is a diagrammatic view showing a construction of an optical coupler employed in a modification to the wavelength division multiplexing-demultiplexing optical transmission-reception system of FIG. 3.

While, in the present embodiment described above, an arrayed-waveguide grating optical multiplexer or demultiplexer is employed for the wave multiplexer 15 and the wave demultiplexer 17 which have an equally spaced wave multiplexing or demultiplexing characteristic, the wave multiplexer 15 and the wave demultiplexer 17 need not necessarily be formed using an arrayed-waveguide grating optical multiplexer or demultiplexer and may be constructed using, for example, as shown in FIG. 6, an optical coupler 23 on which a plurality of dielectric multi-layer films 22a to 22d through which optical signals of different wavelengths from each other can pass are formed.

In particular, referring to FIG. 6, the optical coupler 23 shown has five input/output ports 22-1 to 22-5, and where the optical coupler 23 functions as the wave multiplexer 15, the ports 22-2 to 22-5 function as input ports connected to the external modulators 13-1 to 13-4, respectively, while the port 22-1 functions as an output port connected to the transmission line 16.

In this instance, the dielectric multi-layer films 22a to 22d have functions as wave multiplexing filters which extract optical signals having desired wavelengths from among optical signals inputted thereto from the light source-external modulator pairs 14-1 to 14-4, respectively.

On the other hand, where the optical coupler 23 functions as the wave demultiplexer 17, the port 22-1 functions as an input port connected to the transmission line 16 while the ports 22-2 to 22-5 function as output ports connected to the main signal reception circuits 18-1 to 18-4, respectively.

In this instance, each of the dielectric multi-layer films 22a to 22d has a function as a wave demultiplexing filter which extracts an optical signal having a desired wavelength from within an optical signal inputted thereto from the wavelength division multiplexing optical transmitter 19.

Further, as optical signal pass characteristics of the dielectric multi-layer films 22a to 22d described above, the center wavelengths (center frequencies) λa to λd of the waveforms indicating pass characteristics are set in a substantially equally spaced relationship from each other, and the wavelength pass characteristics of the dielectric multi-layer films 22a to 22d have wide band characteristics within ranges which do not include the center wavelengths (center frequencies) of the waveforms indicting the pass characteristics of adjacent dielectric multi-layer films.

Here, the dielectric multi-layer film 22a is interposed between the port 22-1 and the port 22-2 and as such a pass characteristic as indicated by the waveform (a) of FIG. 5 described hereinabove.

For example, where the optical coupler 23 functions as the wave multiplexer 15, it passes an optical signal whose wavelength is λ1 from within an optical signal from the port 22-2, but where the optical coupler 23 functions as the wave demultiplexer 17, it passes and outputs an optical signal whose wavelength is λ1 from within an optical signal λ(1–4) inputted thereto from the port 22-1, but reflects the other optical signal λ(2–4) than the optical signal of the wavelength λ1.

The dielectric multi-layer film 22b is interposed between the port 22-3 and the dielectric multi-layer film 22a and has such a pass characteristic as indicated by the waveform (b) of FIG. 5 described hereinabove.

For example, where the optical coupler 23 functions as the wave multiplexer 15, it passes an optical signal having the wavelength λ2 from within an optical signal from the port 22-3, but where the optical coupler 23 acts as the wave demultiplexer 17, it passes an optical signal of the wavelength λ2 from within the optical signal λ(2–4) reflected by the dielectric multi-layer film 22a without passing through the dielectric multi-layer film 22a, but reflects the other optical signal λ(3–4) than the optical signal of the wavelength λ2.

The dielectric multi-layer film 22c is interposed between the port 22-4 and the dielectric multi-layer film 22b and has such a pass characteristic as indicated by the waveform (c) of FIG. 5 described hereinabove.

For example, where the optical coupler 23 functions as the wave multiplexer 15, it passes an optical signal having the wavelength λ3 from within the optical signal from the port 22-4, but where the optical coupler 23 functions as the wave demultiplexer 17, it passes and outputs the optical signal of the wavelength λ3 from within the optical signal λ(3–4) reflected from the dielectric multi-layer film 22b without passing through the dielectric multi-layer film 22b, but reflects the other optical signal than the optical signal of the wavelength λ3.

The dielectric multi-layer film 22d is interposed between the port 22-5 and the dielectric multi-layer film 22c and has such a pass characteristic as indicated by the waveform (d) of FIG. 5 described hereinabove.

For example, where the optical coupler 23 functions as the wave multiplexer 15, it passes an optical signal having the wavelength λ4 from within the optical signal from the port 22-5, but where the optical coupler 23 functions as the wave demultiplexer 17, it passes and outputs the optical signal of the wavelength λ4 from within the optical signal λ(3–4) reflected from the dielectric multi-layer film 22c without passing through the dielectric multi-layer film 22c.

Consequently, since the wavelength pass characteristics of the dielectric multi-layer films 22a to 22d of the optical coupler 23 as the wave multiplexer 15 or the wave demultiplexer 17 have wide band characteristics within ranges which do not include the center frequencies of adjacent dielectric multi-layer films, where the optical coupler 23 functions as the wave multiplexer 15, the dielectric multi-layer films 22a to 22d pass therethrough four optical signals λ1 to λ4 from the light source-external modulator pairs 14-1 to 14-4 having wavelengths spaced by unequal distances from each other, but where the optical coupler 23 functions as the wave demultiplexer 17, the dielectric multi-layer films 22a to 22d pass therethrough four optical signals having wavelengths spaced by unequal distances from each other from within an optical signal from the wavelength division multiplexing optical transmitter 19.

Also in the present modified wavelength division multiplexing-demultiplexing optical transmission-reception system having the construction described above, in the wavelength division multiplexing optical transmitter 19, digital signals from the modulation circuits 12-1 to 12-4 serving as main signal sources are modulated at a high speed into optical signals of the wavelengths λ1 to λ4 by the external modulators 13-1 to 13-4, respectively, and then optically wavelength division multiplexed by the optical coupler 23 which functions as the wave multiplexer 15 so that they are outputted as an optical signal λ(1–4) to the transmission line 16.

In other words, the wave multiplexer 15 takes a countermeasure against beat noise arising from four wave mixing by multiplexing and outputting the optical signals of the wavelengths λ1 to λ4 arranged in an unequally spaced relationship from each other.

In particular, since the wavelength pass characteristics of the waveguides 36 to 39 which construct the wave multiplexer 15 are wide band characteristics within ranges which do not include the center wavelengths of optical signals passed by adjacent waveguides, the four optical signals λ1 to λ4 from the light source-external modulator pairs 14-1 to 14-4 arranged in an unequally spaced relationship from each other pass the waveguides 36 to 39, respectively, and are multiplexed with each other and outputted as an optical signal λ(1–4) to the transmission line 16.

Meanwhile, in the wavelength division demultiplexing optical receiver 20, the optical coupler 23 which functions as the wave demultiplexer 17 receives the optical signal λ(1–4) from the wavelength division multiplexing optical transmitter 19, to which the countermeasure against beat noise has been performed by the wavelength division multiplexing optical transmitter 19, demultiplexes the optical signal λ(1–4) into original optical signals of the wavelengths λ1 to λ4 and outputs the optical signals to the main signal reception circuits 18-1 to 18-4, respectively.

In this manner, also with the present modified wavelength division multiplexing-demultiplexing optical transmission-reception system, similarly to the wavelength division multiplexing-demultiplexing optical transmission-reception system of the first embodiment described above, while the wave multiplexer 15 which has an equally spaced wave multiplexing characteristic is employed, an equally spaced arrangement of optical wavelengths can be realized readily. Thus, the wavelength division multiplexing-demultiplexing optical transmission-reception system is advantageous in that the cost for construction of a wavelength division multiplex optical transmitter can be reduced while effectively suppressing beat noise originating from four wave mixing.

b2. Second Modification to the First Embodiment

Figure 7:
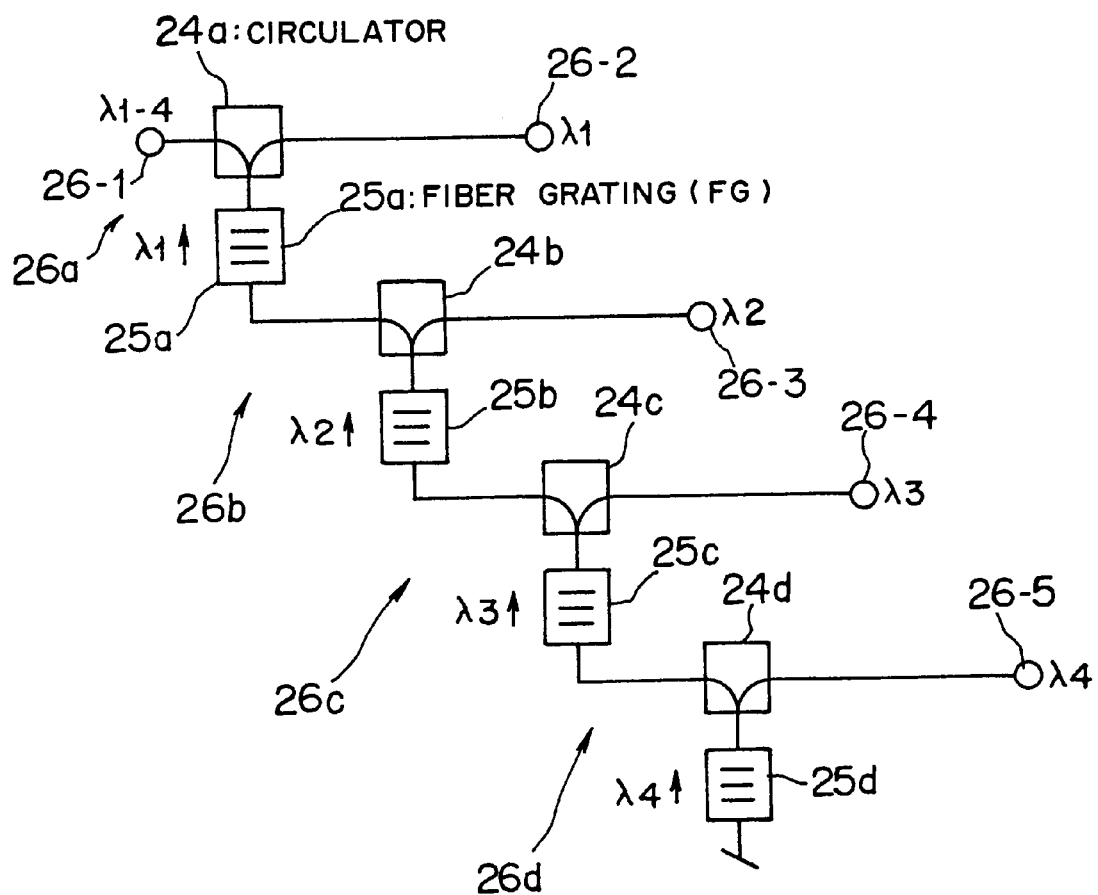
FIG. 7 is a diagrammatic view showing a construction of a directional coupler-fiber grating filter pair employed in another modification to the wavelength division multiplexing-demultiplexing optical transmission-reception system of FIG. 3.

While, in the embodiment described above, an arrayed-waveguide grating optical multiplexer or demultiplexer is employed for the wave multiplexer 15 and the wave demultiplexer 17 which have an equally spaced wave multiplexing or demultiplexing characteristic, the wave multiplexer 15 and the wave demultiplexer 17 need not necessarily be formed using an arrayed-waveguide grating optical multiplexer or demultiplexer and may be constructed otherwise from, for example, as shown in FIG. 7, a plurality of directional coupler-fiber grating filter pairs 26a to 26d connected in a plurality of stages in tandem and formed from directional couplers (circulators) 24a to 24d and fiber grating filters (FG) 25a to 25d, respectively.

In particular, referring to FIG. 7, each of the directional coupler-fiber grating filter pairs 26a to 26d shown has five input/output ports 26-1 to 26-5, and where the directional coupler-fiber grating filter pairs 26a to 26d function as the wave multiplexer 15, the ports 26-2 to 26-5 function as input ports connected to the external modulators 13-1 to 13-4, respectively, while the port 26-1 functions as an output port connected to the transmission line 16.

Further, each of the fiber grating filters 25a to 25d reflects an optical signal of a desired wavelength from among optical signals of the wavelengths $\lambda 1$ to $\lambda 4$ arranged in an unequally spaced relationship from each other, and passes the optical signals of the other wavelengths than the desired wavelength therethrough.

Where the directional coupler-fiber grating filter pairs 26a to 26d function as the wave multiplexer 15, the directional couplers 24d to 24a and the fiber grating filters 25d to 25a have the following constructions.

In particular, the directional coupler 24d outputs the optical signal $\lambda 4$ from the input port 26-4 to the fiber grating filter 25d, but outputs an optical signal inputted thereto from the fiber grating filter 25d to the fiber grating filter 25c.

Meanwhile, the fiber grating filter 25d receives the optical signal from the directional coupler 24d and reflects only the optical signal of the wavelength $\lambda 4$. The reflected optical signal $\lambda 4$ is outputted to the fiber grating filter 25c via the directional coupler 24d.

The directional coupler 24c outputs the optical signal $\lambda 3$ from the input port 26-4 to the fiber grating filter 25c, but outputs an optical signal inputted thereto from the fiber grating filter 25c to the fiber grating filter 25b.

The fiber grating filter 25c reflects the optical signal of the wavelength $\lambda 3$ from the directional coupler 24c, but passes the optical signal $\lambda 4$ from the directional coupler 24d therethrough. Consequently, the optical signals of the wavelengths $\lambda 3$ and $\lambda 4$ are outputted to the fiber grating filter 25b via the directional coupler 24c.

The directional coupler 24b outputs the optical signal $\lambda 2$ from the input port 26-3 to the fiber grating filter 25b, but outputs an optical signal inputted thereto from the fiber grating filter 25b to the fiber grating filter 25a.

The fiber grating filter 25b reflects the optical signal of the wavelength $\lambda 2$ from the directional coupler 24b, but passes the optical signals of the wavelengths $\lambda 3$ and $\lambda 4$ from the directional coupler 24c therethrough. Consequently, the optical signals of the wavelengths $\lambda 2$ to $\lambda 4$ are outputted to the fiber grating filter 25a via the directional coupler 24b.

The directional coupler 24a outputs the optical signal $\lambda 1$ from the input port 26-2 to the fiber grating filter 25a, but outputs an optical signal inputted thereto from the fiber grating filter 25a to the output port 26-1.

The fiber grating filter 25a reflects the optical signal of the wavelength $\lambda 1$ from the directional coupler 24a, but passes the optical signals of the wavelengths $\lambda 2$ to $\lambda 4$ from the directional coupler 24b therethrough. Consequently, an optical signal $\lambda(1-4)$ multiplexed from the optical signals of the wavelengths $\lambda 1$ to $\lambda 4$ is outputted via the directional coupler 24a and the output port 26-1.

Accordingly, the fiber grating filters 25a to 25d have functions as filters (multiplexing filters) for extracting optical signals $\lambda 1$ to $\lambda 4$ of desired wavelengths from among optical signals inputted thereto from the light source-external modulator pairs 14-1 to 14-4, respectively.

Further, since the wavelength pass characteristics of the directional coupler-fiber grating filter pairs 26a to 26d serving as the wave multiplexer 15 have wide band characteristics within ranges which do not include the center frequencies of adjacent waveguides, the four optical signals $\lambda 1$ to $\lambda 4$ from the light source-external modulator pairs 14-1 to 14-4 having wavelengths spaced by unequal distances from each other pass the directional coupler-fiber grating filter pairs 26a to 26d serving as the wave multiplexer 15, respectively.

On the other hand, where the directional coupler-fiber grating filter pairs 26a to 26d function as the wave demultiplexer 17, the port 26-1 functions as an input port connected to the transmission line 16 while the ports 26-2 to 26-4 function as output ports connected to the main signal reception circuits 18-1 to 18-4, respectively.

In this instance, the directional couplers 24a to 24d and the fiber grating filters 25a to 25d have the following constructions.

In particular, the directional coupler 24a outputs an optical signal $\lambda(1-4)$ from the input port 26-1 to the fiber grating filter 25a, but outputs an optical signal from the fiber grating filter 25a to the output port 26-2.

The fiber grating filter 25a reflects the optical signal of the wavelength $\lambda 1$ from among the optical signals of the wavelengths $\lambda 1$ to $\lambda 4$ from the directional coupler 24a but passes the optical signals of the wavelengths $\lambda 2$ to $\lambda 4$, therethrough. Consequently, the optical signal of the wavelength $\lambda 1$ is demultiplexed and outputted via the directional coupler 24a and the output port 26-2.

The directional coupler 24b outputs an optical signal from the fiber grating filter 25a to the fiber grating filter 25b, but outputs an optical signal from the fiber grating filter 25b to the output port 26-3.

The fiber grating filter 25b reflects the optical signal of the wavelength $\lambda 2$ from among the optical signals of the wavelengths $\lambda 2$ to $\lambda 4$ from the fiber grating filter 25a, but passes the optical signals of the wavelengths $\lambda 3$ and $\lambda 4$ therethrough. Consequently, the optical signal of the wavelength $\lambda 2$ is demultiplexed and outputted via the directional coupler 24b and the output port 26-3.

The directional coupler 24c outputs the optical signal from the fiber grating filter 25b to the fiber grating filter 25c, but outputs the optical signal from the fiber grating filter 25c to the output port 26-4.

The fiber grating filter 25c reflects the optical signal of the wavelength $\lambda 3$ from between the optical signals of the wavelengths $\lambda 3$ and $\lambda 4$ from the fiber grating filter 25b, but passes the optical signal of the wavelength $\lambda 4$ therethrough. Consequently, the optical signal of the wavelength $\lambda 3$ is demultiplexed and outputted via the directional coupler 24c and the output port 26-4.

The directional coupler 24d outputs the optical signal from the fiber grating filter 25c to the fiber grating filter 25d, but outputs the optical signal from the fiber grating filter 25d to the output port 26-5.

The fiber grating filter 25d receives the optical signal from the directional coupler 24d and reflects only the optical signal of the wavelength λ4. The reflected optical signal λ4 is outputted to the fiber grating filter 25c via the directional coupler 24d.

Accordingly, the fiber grating filters 25a to 25d described above have functions also as demultiplexing filters for extracting optical signals λ1 to λ4 of desired wavelengths from within an optical signal inputted thereto from the wavelength division multiplexing optical transmitter 19.

It is to be noted that, as wavelength characteristics of optical signals reflected by the fiber grating filters 25a to 25d described above, the center wavelengths (center frequencies) λa to λd are set in a substantially equally spaced relationship from each other, and the wavelength pass characteristics are wide band characteristics within ranges which do not include the center wavelengths (center frequencies) of the waveforms indicating the reflection characteristics of adjacent fiber grating filters.

In other words, since the wavelength pass characteristics of the directional coupler-fiber grating filter pairs 26a to 26d serving as the wave demultiplexer 17 have wide band characteristics within ranges which do not include the center wavelengths of adjacent waveguides, the four optical signals λ1 to λ4 having wavelengths spaced by unequal distances from each other from within an optical signal from the wavelength division multiplexing optical transmitter 19 pass the directional coupler-fiber grating filter pairs 26a to 26d constructing the wave demultiplexer 17, respectively.

In particular, the directional coupler-fiber grating filter pair 26a has such a pass characteristic for an optical signal inputted thereto as indicated by the waveform (a) of FIG. 5 described above. Consequently, the directional coupler-fiber grating filter pair 26a can pass an optical signal of the wavelength λ1 therethrough.

The directional coupler-fiber grating filter pair 26b has such a pass characteristic for an optical signal inputted thereto as indicated by the waveform (b) of FIG. 5 described above. Consequently, the directional coupler-fiber grating filter pair 26b can pass an optical signal of the wavelength λ2 therethrough.

The directional coupler-fiber grating filter pair 26c has such a pass characteristic for an optical signal inputted thereto as indicated by the waveform (c) of FIG. 5 described above. Consequently, the directional coupler-fiber grating filter pair 26c can pass an optical signal of the wavelength λ3 therethrough.

The directional coupler-fiber grating filter pair 26d has such a pass characteristic for an optical signal inputted thereto as indicated by the waveform (d) of FIG. 5 described above. Consequently, the directional coupler-fiber grating filter pair 26d can pass an optical signal of the wavelength λ4 therethrough.

Also with the present modified wavelength division multiplexing-demultiplexing optical transmission-reception system having the construction described above, in the wavelength division multiplexing optical transmitter 19, digital signals from the modulation circuits 12-1 to 12-4 serving as main signal sources are modulated at a high speed into optical signals of the wavelengths λ1 to λ4 by the external modulators 13-1 to 13-4, respectively, and then optically wavelength division multiplexed by the directional coupler-fiber grating filter pairs 26a to 26d serving as the wave multiplexer 15 so that they are outputted as an optical signal λ(1–4) to the transmission line 16.

In other words, the wave multiplexer 15 takes a countermeasure against beat noise arising from four wave mixing by multiplexing and outputting the optical signals of the wavelengths λ1 to λ4 arranged in an unequally spaced relationship from each other.

In particular, since the wavelength pass characteristics of the waveguides 36 to 39 which construct the wave multiplexer 15 are wide band characteristics within ranges which do not include the center wavelengths of the optical signals passed by adjacent waveguides, the four optical signals λ1 to λ4 from the light source-external modulator pairs 14-1 to 14-4 arranged in an unequally spaced relationship from each other pass the waveguides 36 to 39, respectively, and are multiplexed with each other and outputted as an optical signal λ(1–4) to the transmission line 16.

Meanwhile, in the wavelength division demultiplexing optical receiver 20, the directional coupler-fiber grating filter pairs 26a to 26d which function as the wave demultiplexer 17 demultiplex an optical signal λ(1–4) from the wavelength division multiplexing optical transmitter 19, to which the countermeasure against beat noise has been performed by the wavelength division multiplexing optical transmitter 19, into original optical signals of the wavelengths λ1 to λ4 and outputs the optical signals to the main signal reception circuits 18-1 to 18-4, respectively.

In this manner, also with the present modified wavelength division multiplexing-demultiplexing optical transmission-reception system, similarly to the wavelength division multiplexing-demultiplexing optical transmission-reception system of the fist embodiment described above, while the directional coupler-fiber grating filter pairs 26a to 26d serving as the wave multiplexer 15 which has an equally spaced wave multiplexing characteristic are employed, an equally spaced arrangement of optical wavelengths can be realized readily. Accordingly, the modified wavelength division multiplexing-demultiplexing optical transmission-reception system is advantageous in that the cost for construction of a wavelength division multiplex optical transmitter can be reduced while effectively suppressing beat noise originating from four wave mixing.

c. Second Embodiment

A wavelength division multiplexing-demultiplexing optical transmission-reception system according to the present embodiment has such a construction as shown in FIG. 3 similarly to that of the first embodiment described hereinabove, but is different from the wavelength division multiplexing-demultiplexing optical transmission-reception system of the first embodiment in the wavelength pass characteristics of the wave multiplexer 15 and the wave demultiplexer 17.

The wave multiplexer 15 here has, similarly to that in the first embodiment, an equally spaced wavelength optical wave multiplexing characteristic by which optical signals having wavelengths which are spaced by a predetermined equal distance from each other can be multiplexed, and multiplexes, when modulation optical signals λ1 to λ4 (whose wavelengths are arranged in an unequally spaced relationship from each other) from the plurality of light source-external modulator pairs 14-1 to 14-4 are inputted thereto, the optical signals and outputs an optical signal obtained by the multiplexing to the transmission line 16.

The equal space here is a deliberate equal space and is not necessarily limited to a fully equal space. Substantially, due to a dispersion in accuracy among devices, spaces or distances within a range of approximately ±10% with respect to a distance between center wavelengths spaced by an equal distance from each other can be regarded as equal spaces or distances (substantially equal spaces or distances).

The wave multiplexer 15 in the present embodiment is formed from an arrayed-waveguide grating optical multiplexer or demultiplexer which includes a large number of waveguides serving as filters (wave multiplexing filters) for individually extracting optical signals having desired wavelengths from among optical signals inputted thereto from the light source-external modulator pairs 14-1 to 14-4.

The number of the waveguides which construct the arrayed-waveguide grating optical wave multiplexer 15 described above is, different from that in the first embodiment, much greater than the number of the optical signals inputted from the light source-external modulator pairs 14-1 to 14-4, that is, 4 and is, for example, N larger than 14. The wave multiplexer 15 thus has N input ports corresponding to the waveguides and a single output port.

Figure 8:
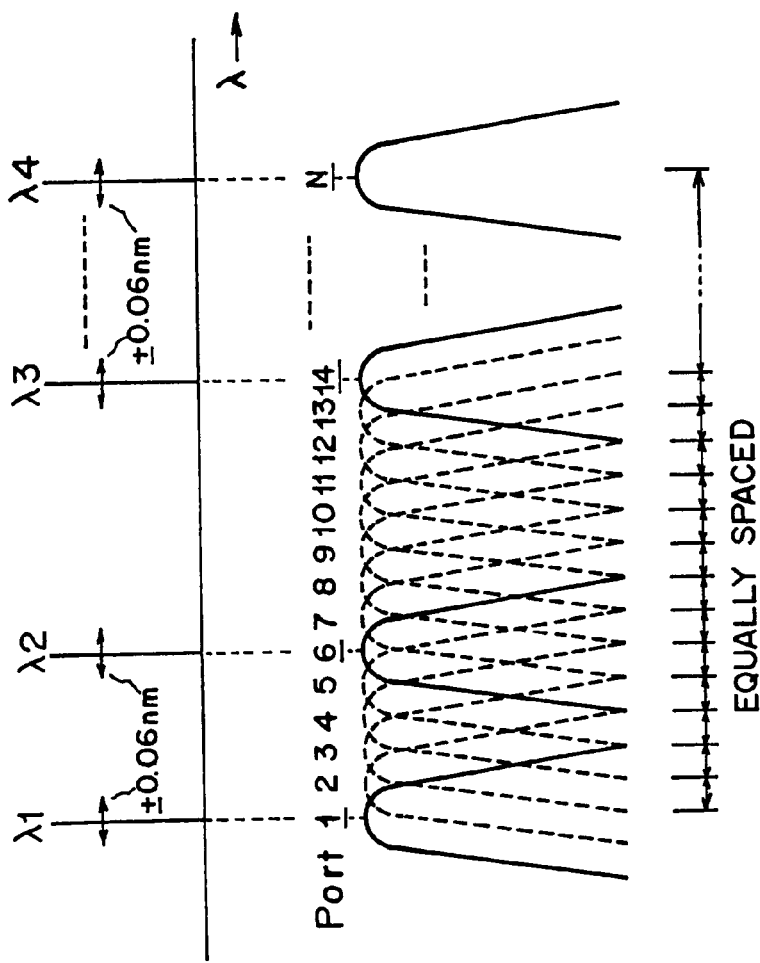
FIG. 8 is a waveform diagram illustrating a wavelength pass characteristic of a wave multiplexer or demultiplexer which is incorporated in a wavelength division multiplexing-demultiplexing optical transmission-reception system according to another preferred embodiment of the present invention.

Further, the waveguides connected to the N input ports of the wave multiplexer 15 individually have, for example, such optical signal wavelength pass characteristics as shown in FIG. 8.

In particular, referring to FIG. 8, the wavelength pass characteristics of the waveguides are set such that the center wavelengths (center frequencies) thereof are arranged in a neighboring and substantially equally spaced relationship from each other so that each of the four optical signals from the light source-external modulator pairs 14-1 to 14-4 having wavelengths spaced by unequal distances from each other may pass one of the large number of waveguides.

Here, while a dispersion by approximately ±0.06 nm can be regarded as an allowable range for the center frequencies due to an error in production of the waveguides, where also the number of wavelengths and the distance between the wavelengths are taken into consideration, the allowable range can be set to approximately ±10% of the width between the center frequencies.

In other words, the center frequencies of the waveguides are set in an equally spaced relationship from each other such that the wavelength distances between light signals which can pass the waveguides may be smaller than the wavelength distances between the four optical signals inputted from the light source-external modulator pairs 14-1 to 14-4, and only necessary ones of the waveguides are used to multiplex the optical signals arranged in an unequally spaced relationship from each other.

More particularly, the light source-external modulator pair 14-1 is connected to the input port "1" from among the N input ports of the wave multiplexer 15 so that an optical signal of the wavelength λ1 passes through one of the waveguides which corresponds to the input port "1".

Similarly, the light source-external modulator pair 14-2 is connected to the input port "6" from among the N input ports of the wave multiplexer 15 so that another optical signal of the wavelength λ2 passes through one of the waveguides which corresponds to the input port "6".

Further, the light source-external modulator pair 14-3 is connected to the input port "14" from among the N input ports of the wave multiplexer 15 so that a further optical signal of the wavelength λ3 passes through one of the waveguides which corresponds to the input port "14".

Furthermore, the light source-external modulator pair 14-4 is connected to the input port "N" from among the N input ports of the wave multiplexer 15 so that a still further optical signal of the wavelength λ4 passes through one of the waveguides which corresponds to the input port "N".

The wave demultiplexer 17 receives, similarly to that in the first embodiment described hereinabove, an optical signal from the wave multiplexer 15 of the. wavelength division multiplexing optical transmitter 19 via the transmission line 16 and demultiplexes the received optical signal into four original main signals. The wave demultiplexer 17 may be formed, for example, from an arrayed-waveguide grating optical multiplexer or demultiplexer (AWG) similarly to the wave multiplexer 15 described hereinabove.

In particular, also the wave demultiplexer 17 is formed from an arrayed-waveguide grating optical multiplexer or demultiplexer which includes a large number of waveguides as filters (multiplexing filters) for individually extracting optical signals having desired wavelengths from within an optical signal inputted thereto from the wavelength division multiplexing optical transmitter 19.

In other words, the wave demultiplexer 17 described above has a configuration wherein the input and output ports are reversed to those of the wave multiplexer 15 described above, or in other words, has a single input port and N output ports, and demultiplexes an optical signal inputted thereto through the input port using only necessary ones of the waveguides corresponding to the N output ports.

The wavelength pass characteristics of the large number of waveguides which construct the wave demultiplexer 17 are similar to those described hereinabove with reference to FIG. 8, and overlapping description is omitted here to avoid redundancy.

The main signal reception circuits 18-1 to 18-4 are connected to the four output ports 32 to 35 of the wave demultiplexer 17, respectively, and have functions as an optical reception section to which optical signals having wavelengths arranged in an unequally spaced relationship from each other are inputted.

In the wavelength division multiplexing-demultiplexing optical transmission-reception system according to the second embodiment of the present invention having the construction described above, digital signals from the modulation circuits 12-1 to 12-4 serving as main signal sources are first modulated at a high speed into optical signals of the wavelengths λ1 to λ4 by the external modulators 13-1 to 13-4 of the wavelength division multiplexing optical transmitter 19, respectively, and then the thus modulated signals are optically wavelength division multiplexed by the wave multiplexer 15 and outputted as an optical signal λ(1–4) from the wave multiplexer 15 to the transmission line 16.

In particular, the four optical signals λ1 to λ4 from the light source-external modulator pairs 14-1 to 14-4 having wavelengths spaced by unequal distances from each other pass through some of the large number of waveguides of the wave multiplexer 15 and are multiplexed with each other so that they are outputted as an optical signal λ(1–4).

Here, the wave multiplexer 15 takes a countermeasure against beat noise arising from four wave mixing by multiplexing and outputting the optical signals of the wavelengths λ1 to λ4 arranged in an unequally spaced relationship from each other.

The optical signal λ(1–4) transmitted on the transmission line 16 is successively amplified by the optical amplifiers 21 so that it is outputted to the wavelength division demultiplexing optical receiver 20 without suffering from any deterioration in optical level thereof.

Meanwhile, in the wavelength division demultiplexing optical receiver 20, the wave demultiplexer 17 receives the optical signal λ(1–4) from the wavelength division multiplexing optical transmitter 19, to which the countermeasure against beat noise has been performed by the wavelength division multiplexing optical transmitter 19, and demultiplexes the optical signal λ(1–4) into original optical signals of the wavelengths λ1 to λ4 as each of them passes through one of the large number of waveguides of the wave demultiplexer 17. The wave demultiplexer 17 thus outputs the optical signals of the wavelengths λ1 to λ4 to the main signal reception circuits 18-1 to 18-4, respectively.

In this manner, with the wavelength division multiplexing-demultiplexing optical transmission-reception system according to the second embodiment of the present invention, since it includes a large number of waveguides for extracting optical signals having desired wavelengths from among optical signals inputted thereto from the light source-external modulator pairs 14-1 to 14-4 and the center frequencies of the waveguides serving as filters are set in a neighboring and substantially equally spaced relationship from each other so that each of the plurality of optical signals from the light source-external modulator pairs 14-1 to 14-4 having wavelengths spaced by unequal distances from each other may pass through one of the large number of waveguides, while the wave multiplexer 15 which has an equally spaced wave multiplexing characteristic is employed, an equally spaced arrangement of optical wavelengths can be realized readily. Accordingly, the wavelength division multiplexing-demultiplexing optical transmission-reception system is advantageous in that the cost for construction of a wavelength division multiplex optical transmitter can be reduced while effectively suppressing beat noise originating from four wave mixing.

Further, since the degree of freedom in manner of the unequally spaced arrangement of the wavelengths of the optical signals transmitted from the light source-external modulator pairs 14-1 to 14-4 is augmented in a predetermined band, the wavelength division multiplexing-demultiplexing optical transmission-reception system is advantageous in that the unequally spaced arrangement can be adjusted readily without varying the specifications of the wave multiplexer 15 and also in that the universal use of an equally spaced wave multiplexer for multiplexing optical signals arranged in an unequally spaced relationship from each other can be augmented.

It is to be noted that, while, in the present embodiment described above, an arrayed-waveguide grating optical multiplexer or demultiplexer is used for the wave multiplexer 15 and the wave demultiplexer 17, an optical coupler (refer to FIG. 6) or a bidirectional coupler-fiber grating filter pair (refer to FIG. 7) similar to that employed in the first or second modification to the first embodiment described hereinabove may be used alternatively.

For example, where the wave multiplexer 15 and the wave demultiplexer 17 are formed using an optical filter, the optical filter is constructed so that a large number of dielectric multi-layer films which can pass optical signals of different wavelengths from each other therethrough are formed thereon and the wavelength pass characteristics of the dielectric multi-layer films are set such that the center wavelengths (center frequencies) thereof may be arranged in a neighboring and substantially equally spaced relationship from each other.

On the other hand, where the wave multiplexer 15 and the wave demultiplexer 17 are formed using a directional coupler-fiber grating filter pair, a large number of directional coupler-fiber grating filter pairs which can pass optical signals of different wavelengths from each other therethrough are connected in multiple stages in tandem and the wavelength pass characteristics of the directional coupler-fiber grating filter pairs are set such that the center frequencies thereof are arranged in a neighboring and substantially equally spaced relationship from each other.

d. Third Embodiment

Figure 9:
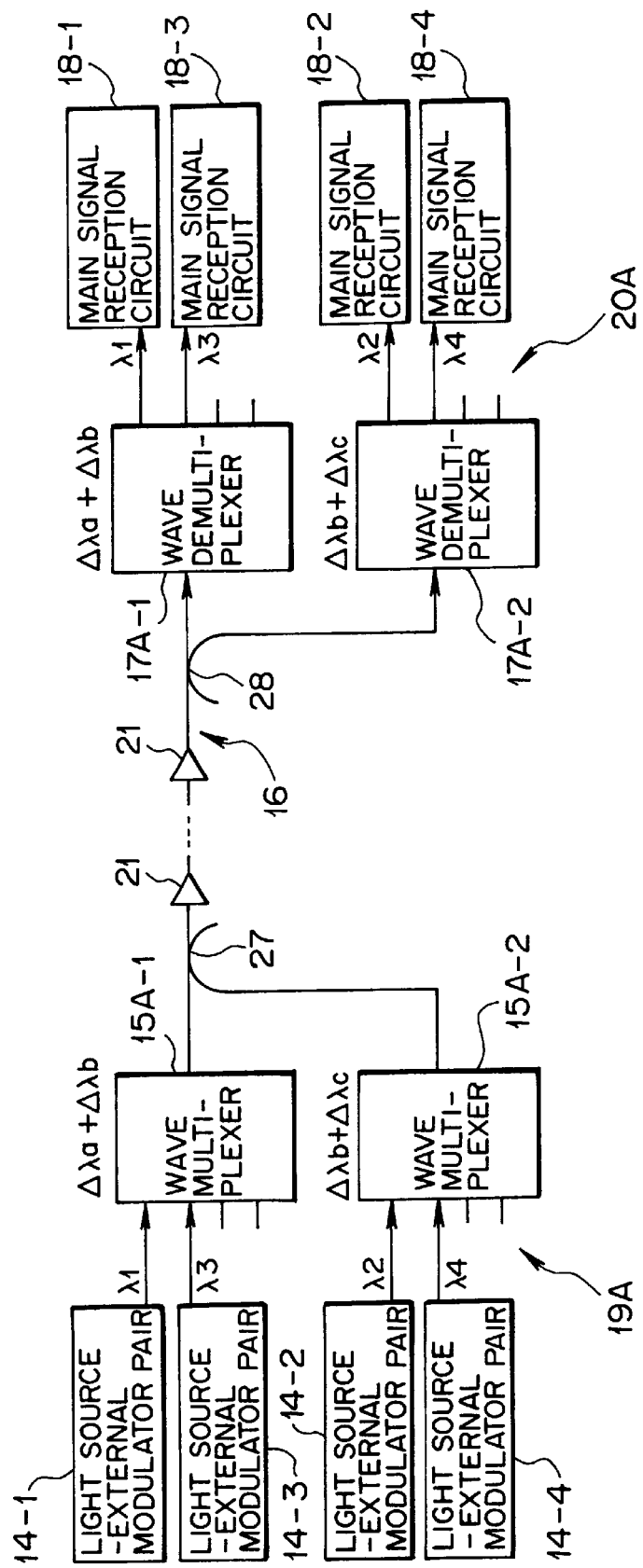
FIG. 9 is a block diagram of a further wavelength division multiplexing-demultiplexing optical transmission-reception system showing a further preferred embodiment of the present invention.

FIG. 9 shows in block diagram a further wavelength division multiplexing-demultiplexing optical transmission-reception system to which the present invention is applied. Referring to FIG. 9, the wavelength division multiplexing-demultiplexing optical transmission-reception system shown includes a wavelength division multiplexing optical transmitter 19A and a wavelength division demultiplexing optical receiver 20A connected to each other by a transmission line 16 similarly as in the wavelength division multiplexing-demultiplexing optical transmission-reception systems of the first and second embodiments described hereinabove. A plurality of optical amplifiers 21 connected in a plurality stages are interposed in the transmission line 16.

The wavelength division multiplexing optical transmitter 19A is similar to the wavelength division multiplexing optical transmitter 19 in the wavelength division multiplexing-demultiplexing optical transmission-reception systems of the first and second embodiments in that it includes modulation circuits 12-1 to 12-4 (not shown in FIG. 4) and four light source-external modulator pairs 14-1 to 14-4, but is different from the wavelength division multiplexing optical transmitter 19 in that it includes a pair of wave multiplexers 15A-1 and 15A-2 connected in parallel and an optical coupler 27.

Thus, also the light source-external modulator pairs 14-1 to 14-4 have functions as optical transmission sections which can output optical signals $\lambda 1$ to $\lambda 4$ having wavelengths spaced by unequal distances from each other, similarly to those in the first and second embodiments described hereinabove.

Meanwhile, the wavelength division demultiplexing optical receiver 20A is similar to the wavelength division demultiplexing optical receiver 20 in the wavelength division multiplexing-demultiplexing optical transmission-reception systems of the first and second embodiments in that it includes four main signal reception circuits 18-1 to 18-4, but is different from the wavelength division demultiplexing optical receiver 20 in that it includes a pair of wave demultiplexers 17A-1 and 17A-2 connected in parallel and an optical coupler 28.

Figures 10A, 10B, 10C:
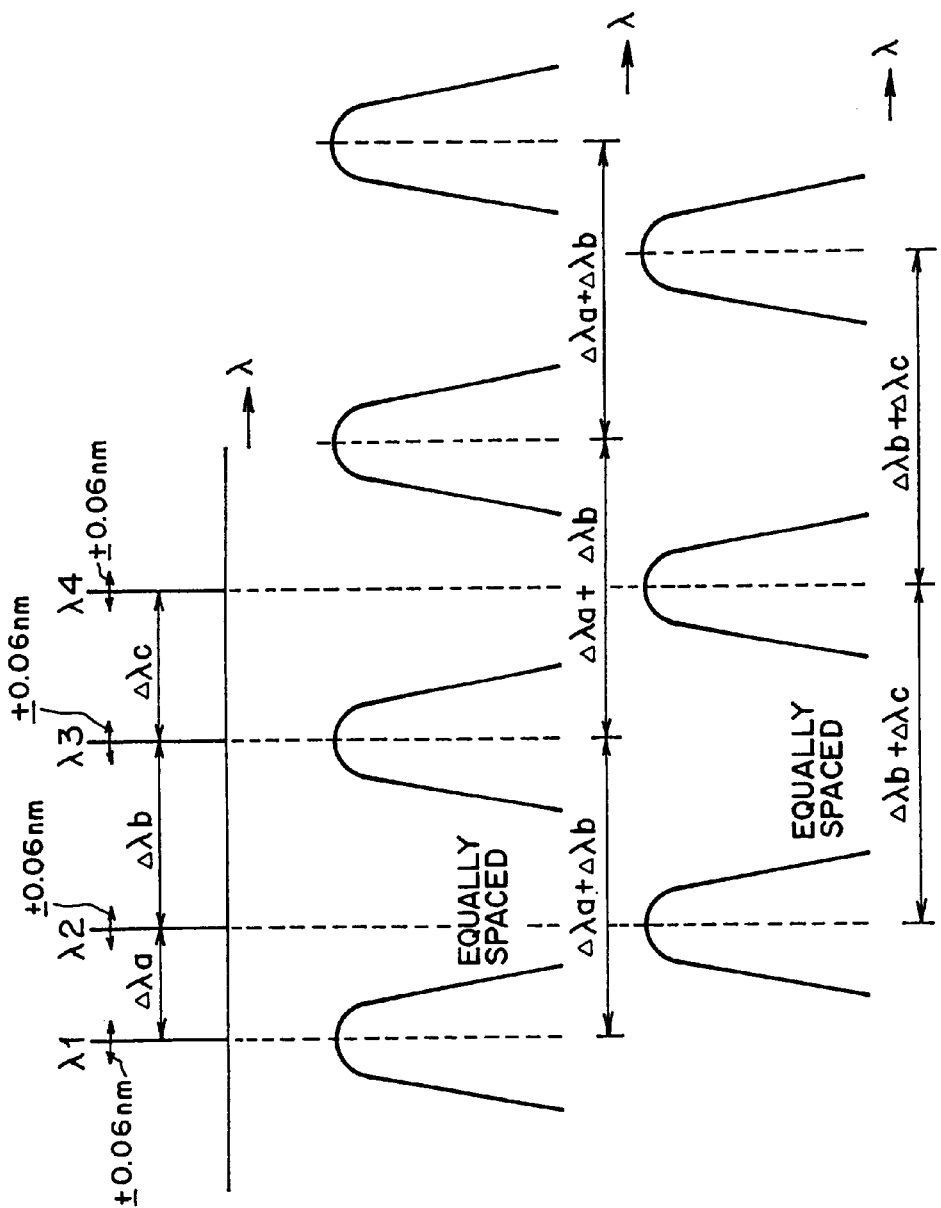
FIGS. 10(a) to 10(c) are waveform diagrams illustrating different wavelength pass characteristics of a wave multiplexer or demultiplexer employed in the wavelength division multiplexing-demultiplexing optical transmission-reception system of FIG. 9.

The wave multiplexer 15A-1 of the wavelength division multiplexing optical transmitter 19A has an equally spaced wave multiplexing characteristic of multiplexing optical signals of an equally spaced wavelength spaced by $\Delta\lambda a+\Delta\lambda b$ from each other as seen from FIG. 10(b). The wave multiplexer 15A-2 has another equally spaced wave multiplexing characteristic of multiplexing optical signals of an equally spaced wavelength spaced by $\Delta\lambda b+\Delta\lambda c$ as seen from FIG. 10(c).

The equal space here is a deliberate equal space and is not necessarily limited to a fully equal space. Substantially, due to a dispersion in accuracy among devices, spaces or distances within a range of approximately ±10% with respect to a distance between center wavelengths spaced by an equal distance from each other can be regarded as equal spaces or distances (substantially equal spaces or distances).

It is to be noted that, as seen from FIG. 10(a), $\Delta\lambda a$ mentioned above represents the wavelength distance $\lambda 2-\lambda 1$ between an optical signal $\lambda 1$ from the light source-external modulator pair 14-1 and another optical signal $\lambda 2$ from the light source-external modulator pair 14-2, $\Delta\lambda b$ represents the wavelength distance $\lambda 3-\lambda 2$ between the optical signal $\lambda 2$ from the light source-external modulator pair 14-2 and a further optical signal $\lambda 3$ from the light source-external modulator pair 14-3, and $\Delta\lambda c$ represents the wavelength distance $\lambda 4-\lambda 3$ between the optical signal $\lambda 3$ from the light source-external modulator pair 14-3 and a still further optical signal $\lambda 4$ from the light source-external modulator pair 14-4.

Accordingly, the wave multiplexer 15A-1 multiplexes, as seen in FIG. 10(b), and outputs the optical signal of the wavelength $\lambda 1$ from the light source-external modulator pair 14-1 and the optical signal of the wavelength λ3 from the light source-external modulator pair 14-3. Meanwhile, as seen in FIG. 10(c), the wave multiplexer 15A-2 multiplexes and outputs the optical signal of the wavelength λ2 from the light source-external modulator pair 14-2 and the optical signal of the wavelength λ4 from the light source-external modulator pair 14-4.

It is to be noted that the wave multiplexers 15A-1 and 15A-2 may be constructed using, similarly to the wave multiplexer 15 in the wavelength division multiplexing-demultiplexing optical transmission-reception system of the first embodiment, an arrayed-waveguide grating optical multiplexer or demultiplexer shown in FIG. 4, or using an optical coupler (refer to reference numeral 23 of FIG. 6) or a bidirectional coupler-fiber grating filter pair (refer to reference characters 26a to 26d of FIG. 7) similar to that employed in the first or second modification to the first embodiment described hereinabove.

The optical coupler 27 multiplexes a signal from the wave multiplexer 15A-1 in which optical signals of the wavelengths λ1 and λ3 are multiplexed in an equally spaced relationship and another signal from the wave multiplexer 15A-2 in which optical signals of the wavelengths λ2 and λ4 are multiplexed in an equally spaced relationship. The multiplexed optical signal from the optical coupler 27 is transmitted as a transmission optical signal λ(1–4) to the wavelength division demultiplexing optical receiver 20A via the transmission line 16.

In other words, an unequally spaced arrangement of the main signal light source wavelengths λ1 to λ4 is realized by the combination of the two wave multiplexers 15A-1 and 15A-2 having different equally spaced wave multiplexing characteristics from each other.

Accordingly, the wave multiplexers 15A-1 and 15A-2 and the optical coupler 27 have a function as a wave multiplexing section for receiving the four optical signals λ1 to λ4 arranged in an unequally spaced relationship from each other from the light source-external modulator pairs 14-1 to 14-4 and multiplexing and outputting the four optical signals from the light source-external modulator pairs 14-1 to 14-4.

Here, while a dispersion by approximately ±0.06 nm can be regarded as an allowable range for the center frequencies due to an error in production of the waveguides, where also the number of wavelengths and the distance between the wavelengths are taken into consideration, the allowable range can be set to approximately ±10% of the width between the center frequencies.

On the other hand, the optical coupler 28 of the wavelength division demultiplexing optical receiver 20A demultiplexes an optical signal λ(1–4) received from the wavelength division multiplexing optical transmitter 19A via the transmission line 16 into a signal in which optical signals of the wavelengths λ1 and λ3 are multiplexed and another signal in which optical signals of the wavelengths λ2 and λ4 are multiplexed. The signal in which the optical signals of the wavelengths λ1 and λ3 are multiplexed is outputted to the wave demultiplexer 17A-1 while the signal in which the optical signals of the wavelengths λ2 and λ4 are multiplexed is outputted to the wave demultiplexer 17A-2.

The wave demultiplexers 17A-1 and 17A-2 receive an optical signal from the optical coupler 27 of the wavelength division multiplexing optical transmitter 19A via the transmission line 16 and demultiplex the optical signal back into four original main signals. Similarly to the wave multiplexers 15A-1 and 15A-2 described above, the wave demultiplexers 17A-1 and 17A-2 may be constructed using an arrayed-waveguide grating optical multiplexer-demultiplexer (AWG) shown in FIG. 4, or using an optical coupler (refer to reference numeral 23 of FIG. 6) or a bidirectional coupler-fiber grating filter pair (refer to reference characters 26a to 26d of FIG. 7) similar to that employed in the first or second modification to the first embodiment described hereinabove.

The wave demultiplexer 17A-1 has an equally spaced wave multiplexing characteristic of demultiplexing an optical signal having equally spaced wavelengths spaced by $\Delta\lambda a + \Delta\lambda b$ from each other, and the wave demultiplexer 17A-2 has another equally spaced wave demultiplexing characteristic of demultiplexing another optical signal having equally spaced wavelengths spaced by $\Delta\lambda b + \Delta\lambda c$.

Accordingly, the wave demultiplexer 17A-1 demultiplexes, as seen in FIG. 10(b), an optical signal inputted thereto into and outputs an optical signal of the wavelength λ1 and another optical signal of the wavelength λ3. Meanwhile, as seen in FIG. 10(c), the wave demultiplexer 17A-2 demultiplexes an optical signal inputted thereto into and outputs an optical signal of the wavelength λ2 from the light source-external modulator pair 14-2 and another optical signal of the wavelength λ4 from the light source-external modulator pair 14-4.

In other words, the wave demultiplexers 17A-1 and 17A-2 of the optical coupler 28 described above have a function as a wave demultiplexing section which receives an optical signal λ(1–4) from the wavelength division multiplexing optical transmitter 19A, demultiplexes it into four optical signals λ1 to λ4 having wavelengths arranged in an unequally spaced relationship from each other and outputs the four optical signals λ1 to λ4 to the main signal reception circuits 18-1 to 18-4, respectively.

Meanwhile, the main signal reception circuits 18-1 to 18-4 are connected to the four output ports 32 to 35 of the wave demultiplexer 17, respectively, and have functions as an optical reception section to which optical signals having wavelengths arranged in an unequally spaced relationship from each other are inputted.

In the wavelength division multiplexing-demultiplexing optical transmission-reception system according to the third embodiment of the present invention having the construction described above, digital signals from the modulation circuits 12-1 to 12-4 serving as main signal sources are first modulated at a high speed into optical signals of the wavelengths λ1 to λ4 by the external modulators 13-1 to 13-4 constructing the light source-external modulator pairs 14-1 to 14-4, respectively, and then the thus modulated signals are optically wavelength division multiplexed by the wave multiplexers 15A-1 and 15A-2 and the optical coupler 27 and outputted as an optical signal λ(1–4) to the transmission line 16.

In particular, the wave multiplexer 15A-1 multiplexes an optical signal of the wavelength λ1 and another optical signal of the wavelength λ3 while the wave multiplexer 15A-2 multiplexes a further optical signal of the wavelength λ3 and a still further optical signal of the wavelength λ4, and the equally spaced wave multiplexed optical signals from the wave multiplexers 15A-1 and 15A-2 are multiplexed by the optical coupler 27. Consequently, the wave multiplexer 15 takes a countermeasure against beat noise arising from four wave mixing by multiplexing and outputting the optical signals of the wavelengths λ1 to λ4 arranged in an unequally spaced relationship from each other.

The optical signal λ(1–4) transmitted on the transmission line 16 is successively amplified by the optical amplifiers 21 so that it is outputted to the wavelength division demultiplexing optical receiver 20A without suffering from any deterioration in optical level thereof.

On the other hand, in the wavelength division demultiplexing optical receiver 20A, the optical coupler 28 receives the optical signal λ(1–4) from the wavelength division multiplexing optical transmitter 19, to which the countermeasure against beat noise has been performed by the wavelength division multiplexing optical transmitter 19, and demultiplexes the optical signal λ(1–4) into a signal in which optical signals of the wavelengths λ1 and λ3 are multiplexed and another signal in which optical signals of the wavelengths λ2 and λ4 are multiplexed.

Thereafter, the wave demultiplexer 17A-1 demultiplexes the signal in which the optical signals of the wavelengths λ1 and λ3 are multiplexed while the wave demultiplexer 17A-2 demultiplexes the signal in which the optical signals of the wavelengths λ2 and λ4 are multiplexed. The original optical signals of the wavelengths λ1 to λ4 thus demultiplexed are outputted to the main signal reception circuits 18-1 to 18-4, respectively.

In this manner, with the wavelength division multiplexing-demultiplexing optical transmission-reception system according to the third embodiment of the present invention, since the wavelength division multiplexing optical transmitter 19A can multiplex and output the four optical signals λ1 to λ4 from the light source-external modulator pairs 14-1 to 14-4 by inputting the optical signals λ1 to λ4 from the light source-external modulator pairs 14-1 to 14-4 having wavelengths arranged in an unequally spaced relationship from each other to the wave multiplexers 15A-1 and 15A-2 and the optical coupler 27 which serve as a wave multiplexing section, while the plurality of wave multiplexers 15A-1 and 15A-2 which have equally spaced wave multiplexing characteristics are employed, an equally spaced arrangement of optical wavelengths can be realized readily. Accordingly, the wavelength division multiplexing-demultiplexing optical transmission-reception system is advantageous in that the cost for construction of a wavelength division multiplex optical transmitter can be reduced while effectively suppressing beat noise originating from four wave mixing.

d1. Modification to the Third Embodiment

While the wave multiplexer 15A-1 of the wavelength division multiplexing-demultiplexing optical transmission-reception system according to the present embodiment described above has an equally spaced wave multiplexing characteristic of multiplexing optical signals of equally spaced wavelengths spaced by Δλa+Δλb from each other as seen in FIG. 10(*b*) and the wave multiplexer 15A-2 has another equally spaced wave multiplexing characteristic of multiplexing optical signals of equally spaced wavelengths spaced by Δλb+Δλc from each other as seen in FIG. 10(*c*), the plurality of wave multiplexers connected in parallel may have some other equally spaced wave multiplexing characteristics.

Similarly, while the wave demultiplexer 17A-1 of the wavelength division multiplexing-demultiplexing optical transmission-reception system according to the present embodiment described above has an equally spaced wave demultiplexing characteristic of demultiplexing an optical signal of equally spaced wavelengths spaced by Δλa+Δλb from each other as seen in FIG. 10(*b*) and the wave demultiplexer 17A-2 has another equally spaced wave demultiplexing characteristic of demultiplexing another optical signal of equally spaced wavelengths spaced by Δλb+Δλc from each other as seen in FIG. 10(*c*), the plurality of wave demultiplexes connected in parallel may have some other equally spaced wave demultiplexing characteristics.

Figure 11:
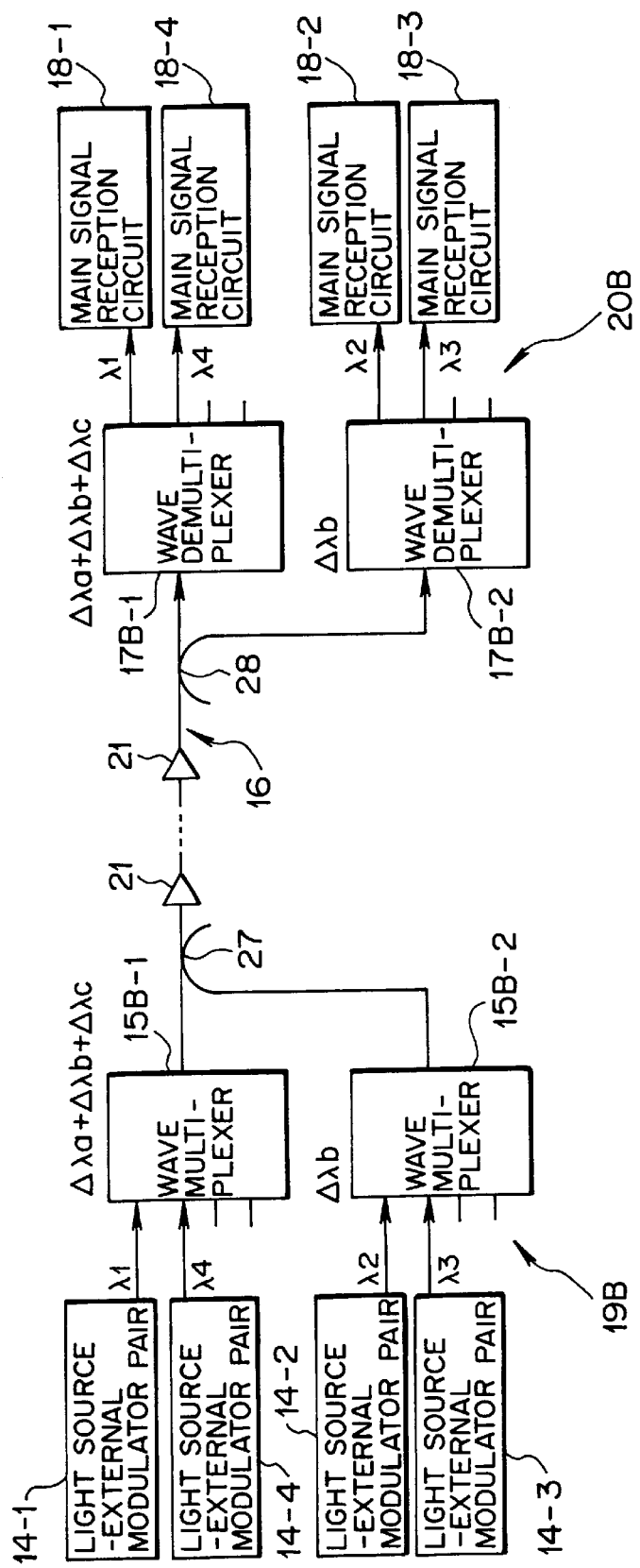
FIG. 11 is a block diagram showing a modification to the wavelength division multiplexing-demultiplexing optical transmission-reception system of FIG. 9.

FIG. 11 shows in block diagram a wavelength division multiplexing-demultiplexing optical transmission-reception system according to a modification to the third embodiment of the present invention. Referring to FIG. 11, the wavelength division multiplexing-demultiplexing optical transmission-reception system according to the present modification is different from that of the third embodiment described in that it includes, in place of the wavelength division multiplexing optical transmitter 19A, a wavelength division multiplexing optical transmitter 19B including a pair of wave multiplexers 15B-1 and 15B-2 having different equally spaced wave multiplexing characteristics and includes, in place of the wavelength division demultiplexing optical receiver 20A, a wavelength division demultiplexing optical receiver 20B including a pair of wave demultiplexers 17B-1 and 17B-2 having different equally spaced wave demultiplexing characteristics.

It is to be noted that, in FIG. 11, like reference characters to those of FIG. 9 denote like elements.

The wave multiplexer 15B-1 of the wavelength division multiplexing optical transmitter 19B has an equally spaced wave multiplexing characteristic of multiplexing optical signals having equally spaced wavelengths spaced by Δλa+Δλb+Δλc from each other as seen in FIG. 12(*b*), and the wave multiplexer 15B-2 has another equally spaced wave multiplexing characteristic of multiplexing optical signals having equal spaced wavelengths spaced by Δλb from each other as seen in FIG. 12(*c*).

It is to be noted that, as seen from FIG. 12(*a*), Δλa mentioned above represents the wavelength distance λ2−λ1 between the optical signal λ1 from the light source-external modulator pair 14-1 and the optical signal λ2 from the light source-external modulator pair 14-2, Δλb represents the wavelength distance λ3−λ2 between the optical signal λ2 from the light source-external modulator pair 14-2 and the optical signal λ3 from the light source-external modulator pair 14-3, and Δλc represents the wavelength distance λ4−λ3 between the optical signal λ3 from the light source-external modulator pair 14-3 and the optical signal λ4 from the light source-external modulator pair 14-4.

Accordingly, the wave multiplexer 15B-1 multiplexes and outputs the optical signal of the wavelength λ1 from the light source-external modulator pair 14-1 and the optical signal of the wavelength λ4 from the light source-external modulator pair 14-4 as seen in FIG. 12(*b*), and the wave multiplexer 15B-2 multiplexes and outputs the optical signal of the wavelength λ2 from the light source-external modulator pair 14-2 and the optical signal of the wavelength λ3 from the light source-external modulator pair 14-3 as seen in FIG. 12(*c*).

It is to be noted that the wave multiplexers 15B-1 and 15B-2 may be constructed using, similarly to the wave multiplexer 15 in the wavelength division multiplexing-demultiplexing optical transmission-reception system of the first embodiment described hereinabove, an arrayed-waveguide grating optical multiplexer or demultiplexer shown in FIG. 4.

The optical coupler 27 multiplexes a signal from the wave multiplexer 15B-1 in which optical signals of the wavelengths λ1 and λ4 are multiplexed in an equally spaced relationship and another signal from the wave multiplexer 15B-2 in which optical signals of the wavelengths λ2 and λ3 are multiplexed in an equally spaced relationship. The multiplexed optical signal from the optical coupler 27 is transmitted as a transmission optical signal λ(1–4) to the wavelength division demultiplexing optical receiver 20B via the transmission line 16.

In other words, an unequally spaced arrangement of the main signal light source wavelengths λ1 to λ4 is realized by the combination of the two wave multiplexers 15B-1 and 15B-2 having different equally spaced wave multiplexing characteristics from each other.

Accordingly, the wave multiplexers 15B-1 and 15B-2 and the optical coupler 27 have a function as a wave multiplexing section for receiving the four optical signals λ1 to λ4 arranged in an unequally spaced relationship from each other from the light source-external modulator pairs 14-1 to 14-4 and multiplexing and outputting the four optical signals from the light source-external modulator pairs 14-1 to 14-4.

On the other hand, the optical coupler 28 of the wavelength division demultiplexing optical receiver 20B demultiplexes the optical signal λ(1–4) received from the wavelength division multiplexing optical transmitter 19B via the transmission line 16 into a signal in which the optical signals of the wavelengths λ1 and λ4 are multiplexed and another signal in which the optical signals of the wavelengths λ2 and λ3 are multiplexed. The signal in which the optical signals of the wavelengths λ1 and λ4 are multiplexed is outputted to the wave demultiplexer 17B-1 while the signal in which the optical signals of the wavelengths λ2 and λ3 are multiplexed is outputted to the wave demultiplexer 17B-2.

The wave demultiplexers 17B-1 and 17B-2 receive an optical signal from the optical coupler 27 of the wavelength division multiplexing optical transmitter 19B via the transmission line 16 and demultiplex the optical signal back into four original main signals. Similarly to the wave multiplexers 15B-1 and 15B-2 described above, the wave demultiplexers 17B-1 and 17B-2 may be constructed using, for example, an arrayed-waveguide grating optical multiplexer or demultiplexer (AWG) shown in FIG. 4.

The wave demultiplexer 17B-1 has an equally spaced wave multiplexing characteristic of demultiplexing an optical signal having equally spaced wavelengths spaced by Δλa+Δλb+Δλc from each other, and the wave demultiplexer 17B-2 has another equally spaced wave demultiplexing characteristic of demultiplexing another optical signal having equally spaced wavelengths spaced by Δλb.

Figures 12A, 12B, 12C:
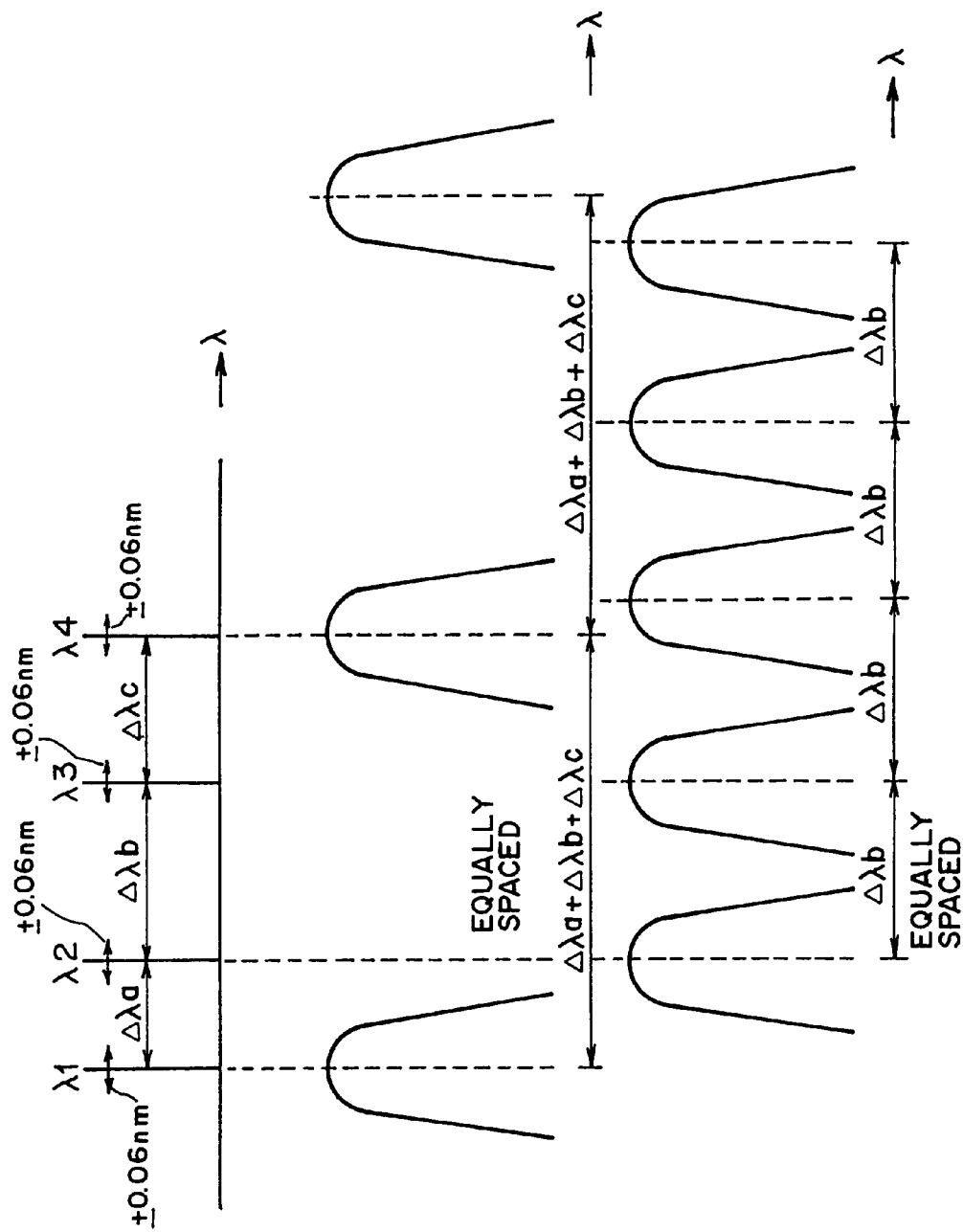
FIGS. 12(a) to 12(c) are waveform diagrams illustrating different wavelength pass characteristics of another wave multiplexer or demultiplexer employed in the modified wavelength division multiplexing-demultiplexing optical transmission-reception system of FIG. 11.

Accordingly, the wave demultiplexer 17B-1 demultiplexes, as seen in FIG. 12(b), an optical signal inputted thereto into and outputs an optical signal of the wavelength λ1 and another optical signal of the wavelength λ4. Meanwhile, as seen in FIG. 12(c), the wave demultiplexer 17B-2 demultiplexes an optical signal inputted thereto into and outputs an optical signal of the wavelength λ2 from the light source-external modulator pair 14-2 and another optical signal of the wavelength λ3 from the light source-external modulator pair 14-3.

In other words, the wave demultiplexers 17B-1 and 17B-2 of the optical coupler 28 described above have a function as a wave demultiplexing section which receives an optical signal λ(1–4) from the wavelength division multiplexing optical transmitter 19B, demultiplexes it into four optical signals λ1 to λ4 having wavelengths arranged in an unequally spaced relationship from each other and outputs the four optical signals λ1 to λ4 to the main signal reception circuits 18-1 to 18-4, respectively.

In the wavelength division multiplexing-demultiplexing optical transmission-reception system according to the modification to the third embodiment of the present invention having the construction described above, by the wavelength division multiplexing optical transmitter 19B, digital signals from the modulation circuits 12-1 to 12-4 serving as main signal sources are first modulated at a high speed into optical signals of the wavelengths λ1 to λ4 by the external modulators 13-1 to 13-4 constructing the light source-external modulator pairs 14-1 to 14-4, and then the thus modulated signals are optically wavelength division multiplexed by the wave multiplexers 15B-1 and 15B-2 and the optical coupler 27 and outputted as an optical signal λ(1–4) to the transmission line 16.

In particular, the wave multiplexer 15B-1 multiplexes an optical signal of the wavelength λ1 and another optical signal of the wavelength λ4 while the wave multiplexer 15B-2 multiplexes a further optical signal of the wavelength λ2 and a still further optical signal of the wavelength λ3, and the equally spaced wave multiplexed optical signals from the wave multiplexers 15B-1 and 15B-2 are further multiplexed by the optical coupler 27. Consequently, the wave multiplexers 15B-1 and 15B-2 take a countermeasure against beat noise arising from four wave mixing by multiplexing and outputting the optical signals of the wavelengths λ1 to λ4 arranged in an unequally spaced relationship from each other.

The optical signal λ(1–4) transmitted on the transmission line 16 is successively amplified by the optical amplifiers 21 so that it is outputted to the wavelength division demultiplexing optical receiver 20B without suffering from any deterioration in optical level thereof.

On the other hand, in the wavelength division demultiplexing optical receiver 20B, the optical coupler 28 receives the optical signal λ(1–4) from the wavelength division multiplexing optical transmitter 19B, to which the countermeasure against beat noise has been performed by the wavelength division multiplexing optical transmitter 19B, and demultiplexes the optical signal λ(1–4) into a signal in which the optical signals of the wavelengths λ1 and λ4 are multiplexed in an equally spaced relationship and another signal in which the optical signals of the wavelengths λ2 and λ3 are multiplexed in an equally spaced relationship.

Thereafter, the wave demultiplexer 17B-1 demultiplexes the signal in which the optical signals of the wavelengths λ1 and λ4 are multiplexed while the wave demultiplexer 17B-2 demultiplexes the signal in which the optical signals of the wavelengths λ2 and λ3 are multiplexed. The original optical signals of the wavelengths λ1 to λ4 thus demultiplexed are outputted to the main signal reception circuits 18-1 to 18-4, respectively.

In this manner, also with the wavelength division multiplexing-demultiplexing optical transmission-reception system according to the modification to the third embodiment of the present invention, since the wavelength division multiplexing optical transmitter 19B can multiplex and output the four optical signals λ1 to λ4 from the light source-external modulator pairs 14-1 to 14-4 by inputting the optical signals λ1 to λ4 from the light source-external modulator pairs 14-1 to 14-4 having wavelengths arranged in an unequally spaced relationship from each other to the wave multiplexers 15B-1 and 15B-2 and the optical coupler 27 which serve as an optical multiplexing section, while the plurality of wave multiplexers 15B-1 and 15B-2 which have equally spaced wave multiplexing characteristics are employed, an equally spaced arrangement of optical wavelengths can be realized readily similarly as with the wavelength division multiplexing-demultiplexing optical transmission-reception system of the third embodiment described hereinabove. Thus, the wavelength division multiplexing-demultiplexing optical transmission-reception system is advantageous in that the cost for construction of a wavelength division multiplex optical transmitter can be reduced while effectively suppressing beat noise originating from four wave mixing.

e. Others

While, in each of the embodiments described above, the wavelength division multiplexing-demultiplexing optical transmission-reception system includes four light source-external modulator pairs 14-1 to 14-4 and four main signal reception circuits 18-1 to 18-4 so that optical signals λ1 to λ4 having wavelengths arranged in an unequally spaced relationship from each other may be transmitted and received, a different plural number of optical signals having wavelengths arranged in an unequally spaced relationship from each other may be transmitted and received.

In this instance, the number of waveguides where the wave multiplexer or wave demultiplexer in any embodiment is formed using an arrayed-waveguide grating wave multiplexer-demultiplexer, the number of dielectric multi-layer films where the wave multiplexer or wave demultiplexer is formed using an optical coupler, the number of stages to be connected in tandem or the numbers of wave multiplexers and wave demultiplexers connected in parallel where the wave multiplexer or wave demultiplexer is formed from directional coupler-fiber grating filter pairs and so forth can be set suitably in accordance with optical signals to be transmitted and received.

The present invention is not limited to the specifically described embodiment, and variations and modifications may be made without departing from the scope of the present invention.

What is claimed is:

1. A wavelength division multiplexing optical transmitter, comprising:

an optical transmission section for outputting a plurality of optical signals having wavelengths spaced by unequal distances from each other; and a wave multiplexer having an equally spaced wavelength optical multiplexing characteristic of multiplexing a plurality of optical signals having wavelengths spaced by a substantially equal distance from each other;

said wave multiplexer being constructed such that, when the plurality of optical signals are inputted thereto from said optical transmission section, said wave multiplexer multiplexes the plurality of optical signals from said optical transmission section into a multiplexed optical signal and outputs the multiplexed optical signal.

2. A wavelength division multiplexing optical transmitter as claimed in claim 1, wherein said optical transmission section includes a plurality of light source-external modulator pairs each including a light source for outputting an optical signal of a wavelength and an external modulator.

3. A wavelength division multiplexing optical transmitter as claimed in claim 1, wherein said wave multiplexer is formed from an arrayed-waveguide grating optical multiplexer.

4. A wavelength division multiplexing optical transmitter as claimed in claim 1, wherein said wave multiplexer is formed from an optical coupler having formed thereon a plurality of dielectric multi-layer films capable of passing optical signals of different wavelengths from each other therethrough.

5. A wavelength division multiplexing optical transmitter as claimed in claim 1, wherein said wave multiplexer is formed from a plurality of directional coupler-fiber grating filter pairs connected in a plurality of stages in tandem and each including a directional coupler and a fiber grating filter for reflecting an optical signal of a wavelength.

6. A wavelength division multiplexing optical transmitter as claimed in claim 1, wherein said wave multiplexer includes a plurality of filters for extracting optical signals having different frequencies from the optical signals inputted thereto from said optical transmission section, said filters being constructed such that center frequencies thereof are set in a substantially equally spaced relationship from each other and wavelength pass characteristics thereof are wide band characteristics within ranges which do not include the center frequencies of adjacent ones of said filters so that the plurality of optical signals from said optical transmission section whose wavelengths are spaced by the unequal distances from each other pass through said plurality of filters.

7. A wavelength division multiplexing optical transmitter as claimed in claim 1, wherein said wave multiplexer includes a plural number of filters larger than the number of the optical signals outputted from said optical transmission section for extracting optical signals having different frequencies from among the optical signals inputted thereto from said optical transmission section, said filters being constructed such that center frequencies thereof are set in a neighboring and substantially equally spaced relationship from each other so that each of the plurality of optical signals from said optical transmission section whose wavelengths are spaced by the unequal distances from each other passes through one of said filters.

8. A wavelength division multiplexing optical transmitter, comprising:

an optical transmission section for outputting a plurality of optical signals having wavelengths spaced by unequal distances from each other; and a wave multiplexing section including a plurality of wave multiplexers connected in parallel and having an equally spaced wavelength optical multiplexing characteristic for multiplexing a plurality of optical signals having wavelengths spaced by a substantially equal distance from each other;

said wave multiplexer being constructed such that, when the plurality of optical signals are inputted thereto from said optical transmission section, said wave multiplexer multiplexes the plurality of optical signals from said optical transmission section into a multiplexed optical signal and outputs the multiplexed optical signal.

9. A wavelength division multiplexing-demultiplexing optical transmission-reception system, comprising:

a wavelength division multiplexing optical transmitter including an optical transmission section for outputting a plurality of optical signals having wavelengths spaced by unequal distances from each other, and a wave multiplexer having an equally spaced wavelength optical multiplexing characteristic of multiplexing a plurality of optical signals having wavelengths spaced by a substantially equal distance from each other, said wave multiplexer being constructed such that, when the plurality of optical signals are inputted thereto from said optical transmission section, said wave multiplexer multiplexes the plurality of optical signals from said optical transmission section into a multiplexed optical signal and outputs the multiplexed optical signal; and a wavelength division demultiplexing optical receiver including a wave demultiplexer having an equally spaced wavelength optical demultiplexing characteristic of demultiplexing an optical signal having wavelengths spaced by substantially equal distances from each other, and an optical reception section for receiving optical signals having wavelengths spaced by unequal distances from each other, said wave demultiplexer being constructed such that, when the optical signal from said wavelength division multiplexing optical transmitter is inputted thereto, said wave demultiplexer demultiplexes the optical signal from said wavelength division multiplexing optical transmitter into a plurality of optical signals having wavelengths spaced by unequal distances from each other and outputs the plurality of optical signals to said optical reception section.

10. A wavelength division multiplexing-demultiplexing optical transmission-reception system as claimed in claim 9, wherein said optical transmission section includes a plurality of light source-external modulator pairs each including a light source for outputting an optical signal of a wavelength and an external modulator.

11. A wavelength division multiplexing-demultiplexing optical transmission-reception system as claimed in claim 9, wherein said wave multiplexer is formed from an arrayed-waveguide grating optical multiplexer, and said wave demultiplexer is formed from an arrayed-waveguide grating optical demultiplexer.

12. A wavelength division multiplexing-demultiplexing optical transmission-reception system as claimed in claim 9, wherein each of said wave multiplexer and said wave demultiplexer is formed from an optical coupler having formed thereon a plurality of dielectric multi-layer films capable of passing optical signals of different wavelengths from each other therethrough.

13. A wavelength division multiplexing-demultiplexing optical transmission-reception system as claimed in claim 9, wherein each of said wave multiplexer and said wave demultiplexer is formed from a plurality of directional coupler-fiber grating filter pairs each including a directional coupler and a fiber grating filter for reflecting an optical signal of a wavelength and connected in a plurality of stages in tandem.

14. A wavelength division multiplexing-demultiplexing optical transmission-reception system as claimed in claim 9, wherein said wave multiplexer includes a plurality of wave multiplexing filters for extracting optical signals having different frequencies from the optical signals inputted thereto from said optical transmission section, said wave multiplexing filters having center frequencies set in a substantially equally spaced relationship from each other, and said wave demultiplexer includes a plurality of wave demultiplexing filters for extracting optical signals having different wavelengths from within the optical signal inputted thereto from said wavelength division multiplexing optical transmitter, said wave demultiplexing filters having center frequencies set in a substantially equally spaced relationship from each other, said wave multiplexing filters and said wave demultiplexing filters having wavelength pass characteristics which are wide band characteristics within ranges which do not include the center frequencies of adjacent ones of the filters so that, in said wave multiplexer, the plurality of optical signals from said optical transmission section whose wavelengths are spaced by the unequal distances from each other pass through said plurality of wave multiplexing filters, but in said wave demultiplexer, a plurality of optical signals demultiplexed from the optical signal from said wavelength division multiplexing optical transmitter and having the wavelengths spaced by the unequal distances from each other pass through said plurality of wave demultiplexing filters.

15. A wavelength division multiplexing-demultiplexing optical transmission-reception system as claimed in claim 9, wherein said wave multiplexer includes a plural number of wave multiplexing filters larger than the number of the optical signals outputted from said optical transmission section for extracting optical signals having different frequencies from among the optical signals inputted thereto from said optical transmission section, said wave multiplexing filters having center frequencies set in a neighboring and substantially equally spaced relationship from each other, and said wave demultiplexer includes a plural number of wave demultiplexing filters larger than the number of the optical signals to be outputted from said wave demultiplexer for extracting optical signals having different wavelengths from within the optical signal inputted thereto from said wavelength division multiplexing optical transmitter, said wave demultiplexing filters having center frequencies set in a substantially equally spaced relationship from each other, said wave multiplexing filters and said wave demultiplexing filters being constructed such that, in said wave multiplexer, each of the plurality of optical signals from said optical transmission section whose wavelengths are spaced by the unequal distances from each other passes through one of said wave multiplexing filters, but in said wave demultiplexer, each of a plurality of optical signals demultiplexed from the optical signal from said wavelength division multiplexing optical transmitter and having the wavelengths spaced by the unequal distances from each other passes through one of said wave demultiplexing filters.

16. A wavelength division multiplexing-demultiplexing optical transmission-reception system, comprising:
a wavelength division multiplexing optical transmitter including an optical transmission section for outputting a plurality of optical signals having wavelengths spaced by unequal distances from each other, and a wave multiplexing section including a plurality of wave multiplexers connected in parallel and having an equally spaced wavelength optical multiplexing characteristic for multiplexing a plurality of optical signals having wavelengths spaced by a substantially equal distance from each other, said wave multiplexing section being constructed such that, when the plurality of optical signals are inputted thereto from said optical transmission section, said wave multiplexing section multiplexes the plurality of optical signals from said optical transmission section into a multiplexed optical signal and outputs the multiplexed optical signal; and
a wavelength division demultiplexing optical receiver including a wave demultiplexing section including a plurality of wave multiplexers connected in parallel and having an equally spaced wavelength optical multiplexing characteristic of demultiplexing an optical signal having wavelengths spaced by substantially equal distances from each other, and an optical reception section for receiving optical signals having wavelengths spaced by unequal distances from each other, said wave demultiplexing section being constructed such that, when the optical signal from said wavelength division multiplexing optical transmitter is inputted thereto, said wave demultiplexing section demultiplexes the optical signal from said wavelength division multiplexing optical transmitter into a plurality of optical signals having wavelengths spaced by unequal distances from each other and outputs the plurality of optical signals to said optical reception section.

17. A transmitter comprising:
an optical transmission section producing a plurality of optical signals having wavelengths spaced by unequal distances from each other; and
a multiplexer having pass characteristics of a plurality of pass bands with a plurality of center wavelengths, respectively, the center wavelengths being equally spaced, the multiplexer multiplexing the plurality of optical signals into a multiplexed signal.

18. A transmitter as claimed in claim 17, wherein the optical transmission section comprises:

a plurality of light source-external modulator pairs for producing the plurality of optical signals, respectively.

19. A transmitter as claimed in claim 17, wherein the multiplexer comprises an arrayed-waveguide grating optical multiplexer.

20. A transmitter as claimed in claim 17, wherein the multiplexer comprises an optical coupler having formed thereon a plurality of dielectric multi-layer films capable of passing optical signals of different wavelengths from each other therethrough.

21. A transmitter as claimed in claim 17, wherein the multiplexer comprises a plurality of directional coupler-fiber grating filter pairs connected in a plurality of stages in tandem and each including a directional coupler and a fiber grating filter for reflecting an optical signal of a specific wavelength.

22. A transmitter as claimed in claim 17, wherein each pass band has wide band wavelength pass characteristics which do not include the center frequencies of adjacent pass bands.

23. A transmitter as claimed in claim 17, wherein the multiplexer includes a plurality of filters providing the plurality of pass bands, respectively, the number of filters being larger than the number of the optical signals produced by the optical transmission section, the filters having center frequencies set in a substantially equally spaced relationship from each other so that each of the plurality of optical signals produced by the optical transmission section pass through one of the filters.

24. An optical system comprising:
a multiplexer having pass characteristics of a plurality of pass bands with a plurality of center wavelengths, respectively, the center wavelengths being equally spaced, the multiplexer multiplexing a plurality of optical signals having unequally spaced wavelengths into a multiplexed signal; and
a demultiplexer having pass characteristics of a plurality of pass bands with a plurality of center wavelengths, respectively, the center wavelengths being equally spaced, the demultiplexer demultiplexing the multiplexed signal into the plurality of optical signals having unequal spaced wavelengths.

25. An optical system as claimed in claim 24, wherein the multiplexer comprises an arrayed-waveguide grating optical multiplexer, and the demultiplexer comprises an arrayed-waveguide grating optical demultiplexer.

26. An optical system as claimed in claim 24, wherein the multiplexer and demultiplexer are each formed from an optical coupler having formed thereon a plurality of dielectric multi-layer films capable of passing optical signals of different wavelengths from each other therethrough.

27. An optical system as claimed in claim 24, wherein the multiplexer and demultiplexer are each formed from a plurality of directional coupler-fiber grating filter pairs each including a directional coupler and a fiber grating filter for reflecting an optical signal of a wavelength and connected in a plurality of stages in tandem.

28. An optical multiplexer for multiplexing a plurality of optical signals having wavelengths spaced by unequal distances from each other, the multiplexer comprising:
filters having pass bands, respectively, each pass band having a center wavelength, the center wavelengths being equally spaced, each of the optical signals passing through a respective filter, the filtered optical signals being combined into a wavelength division multiplexed signal.

29. An optical multiplexer as claimed in claim 28, wherein the each of the filters has a wide band characteristic with a range which does not include the center frequencies of adjacent filters.

30. A transmitter comprising:
an optical transmission section producing a plurality of optical signals having wavelengths spaced by unequal distances from each other; and
multiplexing means, having pass characteristics of a plurality of pass bands with a plurality of center wavelengths, respectively, the center wavelengths being equally spaced, for multiplexing the plurality of optical signals into a multiplexed signal.

31. A receiver for receiving a multiplexed signal including a plurality of optical signals having unequally spaced wavelengths multiplexed together, the receiver comprising:
a demultiplexer demultiplexing the multiplexed signal into the plurality of optical signals having unequal spaced wavelengths, the demultiplexer having pass characteristics of a plurality of pass bands with a plurality of center wavelengths, respectively, the center wavelengths being equally spaced.

32. A receiver as claimed in claim 31, wherein the demultiplexer comprises an arrayed-waveguide grating optical demultiplexer.

33. A receiver as claimed in claim 31, wherein the demultiplexer is formed from an optical coupler having formed thereon a plurality of dielectric multi-layer films capable of passing optical signal of different wavelengths from each other therethrough.

34. A receiver as claimed in claim 31, wherein the demultiplexer comprises a plurality of directional coupler-fiber grating filter pairs connected in a plurality of stages in tandem and each including a directional coupler and a fiber grating filter for reflecting an optical signal of a specific wavelength.

35. A receiver as claimed in claim 31, wherein the demultiplexer includes a plurality of filters having a plurality of respectively corresponding center frequencies set in a substantially equally spaced relationship from each other, filter having a wide band wavelength pass characteristic with a range which does not include the center frequencies of adjacent filters so that the plurality of optical signals having unequally spaced wavelengths pass through the filters.

36. A receiver as in claim 31, wherein the demultiplexer includes a plurality of filters larger than the number of optical signals to be demultiplexed.

37. A new receiver as in claim 31, wherein the demultiplexer includes a plurality of filters larger than the number of optical signals to be demulitplexed, the plurality of filters having a plurality of respectively corresponding center frequencies, the center frequencies set in a substantially equally spaced relationship from each other so that the plurality of optical signals having unequally spaced wavelengths pass through the filters.

38. A receiver as in claim 31, further comprising:
an optical receiving section the demultiplexed plurality of optical signals.

39. A receiver for receiving a multiplexed signal including a plurality of optical signals having unequally spaced wavelengths mulitplexed together, the receiver comprising:
at least two demultiplexers connected in parallel, said at least two demultiplexers together demultiplexing the multiplexed signal into the plurality of optical signals having unequal spaced wavelengths, each of said at least two demulitplexers having pass characteristics of a plurality of pass bands with a plurality of center wavelengths, respectively, the center wavelengths being equally spaced.

40. A receiver as claimed in claim 39, wherein at least one of the demultiplexers comprises an arrayed-waveguide grating optical demultiplexer.

41. A receiver as claimed in claim 39, wherein at least one of the demultiplexers is formed from an optical coupler having formed thereon a plurality of dielectric multi-layer films capable of passing optical signals of different wavelengths from each other therethrough.

42. A receiver as claimed in claim 39, wherein at least one of the demultiplexers comprises a plurality of directional coupler-fiber grating filter pairs connected in a plurality of stages in tandem and each including a directional coupler and a fiber grating filter for reflecting an optical singal of a specific wavelength.

43. A receiver as claimed in claim 39, wherein at least one of the demultiplexers includes a plurality of filters having a plurality of respectively corresponding center frequencies set in a substantially equally spaced relationship from each other, each filter having a wide band wavelength pass characteristic with a range which does not include the center frequencies of adjacent filters.

44. A receiver as in claim 39, further comprising:

an optical receiving section receiving the demultiplexed plurality of optical signals.

* * * * *

UNITED STATES PATENT AND TRADEMARK OFFICE
CERTIFICATE OF CORRECTION

PATENT NO.:   6,118,561
DATED     :   September 12, 2000
INVENTOR(S):  Takanori MAKI It is certified that an error appears in the above-identified patent and that said Letters Patent is hereby corrected as shown below:

Col. 34, line 55, after "receiving section" insert --receiving--.

Signed and Sealed this

Twenty-fourth Day of April, 2001

Attest:

NICHOLAS P. GODICI

*Attesting Officer*   Acting Director of the United States Patent and Trademark Office

UNITED STATES PATENT AND TRADEMARK OFFICE
CERTIFICATE OF CORRECTION

PATENT NO. : 6,118,561 Page 1 of 1
DATED : September 12, 2000
INVENTOR(S) : Takanori Maki It is certified that error appears in the above-identified patent and that said Letters Patent is hereby corrected as shown below:

Column 34,
Line 55, after "receiving section" insert -- receiving --.

Signed and Sealed this

Eighteenth Day of May, 2004

JON W. DUDAS
*Acting Director of the United States Patent and Trademark Office*